Figure 1:
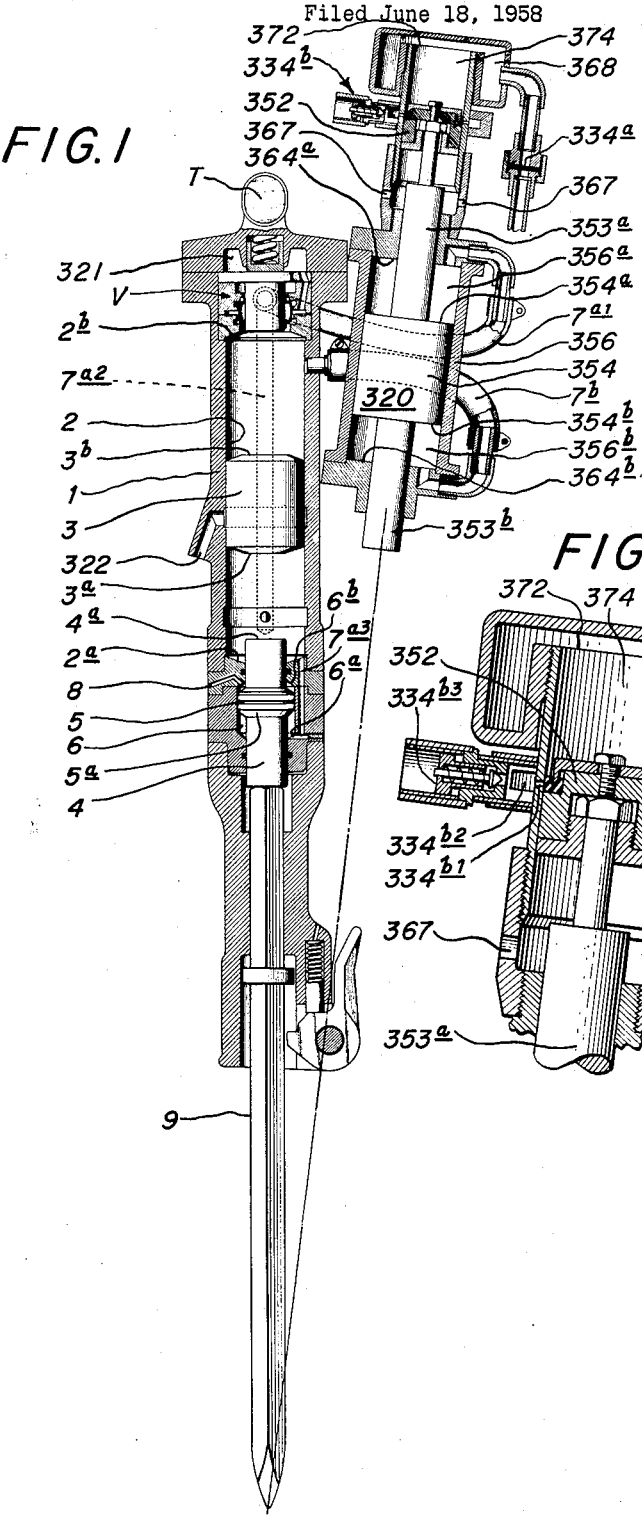

April 10, 1962 C. LEAVELL 3,028,841

VIBRATION ELIMINATION

Filed June 18, 1958

# United States Patent Office 3,028,841
Patented Apr. 10, 1962

3,028,841
VIBRATION ELIMINATION
Charles Leavell, 206 S. Fairfield Ave., Lombard, Ill.
Filed June 18, 1958, Ser. No. 742,878
65 Claims. (Cl. 121—13)

This invention is concerned with the elimination of vibration and it has utility in application to a variety of vibrating structures such as percussive tools, automobile bodies, flywheel and other rotor supports, supports for machines generating yet more complex vibrations, and automobile and other drive shafts actuated by non-uniform torque.

The greater part of anti-vibration research may be said to pertain to the mechanical combination of (1) a desirably or unavoidably vibrating body, (2) a second body in which the occurrence of vibration is objectionable, and (3) connecting structure accomplishing a necessary transmission of force between the two bodies; and, in terms of these particular elements of the combination may be said more specifically to pertain to the problem of maintaining the necessary transmission of force between the two bodies through such connecting structure and, at the same time, minimizing the communication of vibration therethrough, from the desirably or unavoidably vibrating body to such second body. In this statement of the most frequently attacked problem in anti-vibration research, the term "force" is used in its popular sense to include any mass-accelerating power applied along any sort of path whatever, whether straight, circular, otherwise arcuate, or of any other description. Also, in this statement, the terms "vibration," "vibrating," "vibratory," etc. are used in a comprehensive sense including and having reference to any periodically, irregularly, or randomly repetitive movement describable in popular terms as reciprocation, oscillation, sequential displacement, etc.

The hand-held pneumatic paving breaker, and the automobile considered with respect to its suspension system, may be cited as commonly known machines respectively exemplifying the basic tripartite vibratile structure generally described in the foregoing paragraph.

With respect to the hand-held pneumatic paving breaker, widely used in street demolition, the "desirably or unavoidably vibrating body" is its hammer. This hammer reciprocates or vibrates within a cylinder provided by a casing equipped with handles, which comprises the "second body in which the occurrence of vibration is objectionable." The valve-directed presence of compressed air alternately above and below the hammer in the cylinder causes the hammer to reciprocate. It is this cylinder and compressed air composition which constitutes the "connecting structure accomplishing a necessary transmission of force between the two bodies," whereby, in paving breakers of the ordinary type, force-variations, causing objectionable vibrations in this second body (the casing and handle unit), are communicated thereto.

With respect to the case of the automobile, the "desirably or unavoidably vibrating body" may be considered any one of its wheels as it rises and falls in rolling over road bumps, and the "second body in which the occurrence of vibration is objectionable" is the car body. The spring interconnecting the wheel and car body is the "connecting structure accomplishing a necessary transmission of force between the two bodies," for if the spring, together with the other three springs sustaining the car body, did not transmit a sufficient supporting force to the car body, it would not remain in its desired elevation above the road. And, accompanying the transmission of this supporting force through the spring suspension, is the well-known delivery of objectionable vibrating or bumping action to the car body from the vertically vibrating wheels.

Attention is now directed to the statement made in the second paragraph of this specification, relative to the basic tripartite vibratile structure defined therein, to the effect that the greater part of anti-vibration research specifically pertains to the problem of minimizing the communication of vibration through the force-transmitting connecting structure recited as the third element of that tripartite structure.

Judging by the efforts of previous workers in this greater division of anti-vibration research, it appears that almost without exception they have been too easily content with a defeatist interpretation of this objective of minimizing the communication of vibration, which amounted to no more than the rather inconclusive purpose of reducing the amplitudes of the vibration fed into the connecting structure at one of its ends, by the desirably or unavoidably vibrating body, to lesser but admittedly still very noticeable vibration amplitudes delivered from the other end thereof to the second body in which the occurrence of vibration is objectionable. Apparently the ideal goal of reducing such delivered vibration amplitudes substantially to zero has been almost universally neglected because of a negative faith that it must be physically impossible to attain this goal.

My program of departure from the other and previous workers in this major division of anti-vibration research commenced with my realization, early in the year 1941, that a connecting structure or linkage adapted to transmit a force of one particular value only is inherently incapable of transmitting a mechanical vibration. Upon consideration of this proposition, which I shall hereafter refer to as "The Basic Proposition of Vibration Elimination," it will be evident that it is correct, because, obviously, the reversing accelerations associated with any vibratory movement of mass cannot be maintained in a mass in any second locality, as the result of an original vibratory activity in a first locality, except by the delivery of an unconstant force from the first to the second of these localities. To the best of my knowledge, the first practical expression of this basic proposition referring to the use of a constant-force linkage for the elimination of vibration, as opposed to its mere reduction in amplitude, was set forth in U.S. Patent No. 2,400,650, applied for on September 2, 1941, in which John A. Wheeler and I disclosed such linkages of pneumatic types, made operative by the maintenance of pressures of constant values, and illustratively applied between ordinary vibrating pneumatic paving breakers and outer handle-bearing casings therefor, to provide externally vibrationless concrete-breaking tools for hand-held use.

And whereas the compositions of these particular hand-held tools include handles as exemplifying the necessary control means whereby in the proper operation of the tool by the worker certain vibration-generating configurations of the solid parts of the pneumatic constant-force linkages thus employed are normally prevented, it is one of the important purposes of the instant patent application to set forth an entirely automatic instance of such control means, so as to disclose how The Basic Proposition of Vibration Elimination can be put into practical effect in a vast variety of useful applications to (a) reduce the required degree of concentration by human operators in some cases, and (b) entirely eliminate the need for human attention in other cases. From this point of view, the invention herein described and claimed is, logically speaking, a special instance of the fundamental vibration-eliminating invention originally disclosed in the aforesaid Patent No. 2,400,650; while speaking practically, the advance in the new art of vibration elimination contributed by this special instance will be seen to be of revolutionary consequence by virtue of its bringing substantially all practical problems pertaining to objectionable vibration within the scope of this new art, so that the useful substitution of vibration elimination for mere vibration reduction can be effected in the treatment of all types of machines, engines, vehicles, and mechanical devices.

Further and more generally to this point, the inventive work I have done relative to the aforesaid basic tripartite vibratile structure may justifiably be called comprehensive, and it is correct to say, without restriction as to the particular character of the vibratory motion imposed on the desirably or unavoidably vibratory component of any useful exemplification of this basic structure, that its communication to the component thereof in which vibration is objectionable can be prevented by employing, as the force-transmitting component interconnecting such two components, a properly designed entirely automatic constant-force linkage of appropriate type, employing the force regulation principles herein disclosed.

Nevertheless, it will assist the organization of this discussion which thus has useful application to any vibratory motion of any character whatever that can possibly be imposed on the desirably or unavoidably vibrating component of such a tripartite structure, to introduce a system for classifying vibrations, designed so as to comprehend all possible vibratory motions, and at the same time to subdivide this comprehended matter into a number of distinct types, designated with respect to conveniently distinguishable degrees of complexity of the paths traced in space by vibratory motions.

Specifically, I have found the simple distinctions relative to path-complexity defined as in analytic geometry, in terms of the fewest-dimensioned spaces capable of containing the paths, both adequate for purposes of classification and valuably suggestive as to inventive attack; and accordingly, I shall hereinafter classify any vibration with reference to a path traced by it as being either (A) a 1-dimensional or linear vibration, or (B) a 2-dimensional or planar vibration, or (C) a 3-dimensional or solid vibration, depending on whether (a) such path can exist within a straight line, or (b) not being capable of such confinement within a line, can exist within a plane, or (c) not being capable of such confinement within a plane, can exist within a solid space (i.e., a volume).

It will be noted that if the element exhibiting the vibration to be categorized in accordance with this classification scheme is a ponderable body of greater dimensions than a geometric point, the question arises as to just what point either upon its surface or within its mass is to be taken as tracing the path with respect to which the vibratory motion of the element will be classified as being either 1-, 2-, or 3-dimensional (or linear, planar, or solid), and it may be stated in general that the center of gravity of such a body can be used conveniently as the determining point. In other words, the vibratory motion of the body will generally be classified in accordance with the nature of the path traced by its center of gravity.

However, since any such ponderable body may (or may not) exhibit an angular vibration about its center of gravity simultaneously with the description of a path by the center of gravity, and also when its center of gravity is stationary, the classification system may be expanded to include the following seven cases:

I(a) Vibratory motion of a body comprising a linear vibration of its center of gravity associated with a condition of no angular vibration of the body.

(b) Vibratory motion of a body comprising a linear vibration of its center of gravity associated with an angular vibration about its center of gravity.

II(a) Vibratory motion of a body comprising a planar vibration of its center of gravity associated with a condition of no angular vibration of the body.

(b) Vibratory motion of a body comprising a planar vibration of its center of gravity associated with an angular vibration about its center of gravity.

III(a) Vibratory motion of a body comprising a solid vibration of its center of gravity associated with a condition of no angular vibration of the body.

(b) Vibratory motion of a body comprising a solid vibration of its center of gravity associated with an angular vibration about its center of gravity.

IV Vibratory motion of a body comprising an angular vibration about its center of gravity associated with a stationary condition of its center of gravity.

In order to simplify the disclosure, only cases coming under I(a) will be considered specifically in this application, but it should be understood that the principles developed in this particular connection are also applicable to the other six cases in this classification system.

It is now apparent that the principal reference of this invention is to the field of vibration elimination—as contrasted with mere vibration reduction or damping—and one of the objects hereof is to provide improved means capable of eliminating vibration in any such "second body in which the occurrence of vibration is objectionable" in a variety of tripartite structures as defined hereinbefore, while maintaining a force-communicating linkage between such second and vibrationless body and the "desirably or unavoidably vibrating body" sometimes referred to hereinafter as an unavoidably or necessarily vibrating body.

And whereas prior anti-vibrative investigations have been concerned principally with the mere reduction of vibration through a variety of ingenious damping mechanisms that differed from each other mainly in structural details, my divergence in attack which led to the creation of the new field of vibration elimination came with the conviction that there could be no further fundamental progress in anti-vibrative devices without the discovery of a basic method for regulating and controlling the "necessary force" operative between the two bodies in the aforesaid tripartite structure so as to eliminate its capability of transmitting vibration therebetween, and accordingly still another object of the instant invention is that of providing an improvement in such a basic method.

Another object of the invention is to provide in tripartite structures having a vibratory element, a vibrationless element, and force-linkage structure therebetween, a fully automatic means for imposing a "force-invariable" positional stability on the vibrationless element whereby a predetermined relation is maintained between the vibratory and vibrationless elements irrespective of variations in the external force acting on one or both of these elements. This means will be referred to on occasion hereinafter as the "pneumatic brain."

A further object of this invention is to provide in structures having the tripartite elements described hereinbefore, a pneumatic column extending between opposed areas of the vibratory and vibrationless elements which serves as the connecting structure for accomplishing a necessary transmission of force between those two elements, and in combination therewith a means for maintaining the force developed in such pneumatic column substantially constant during individual vibratory displacements of one of the elements with reference to the other, and automatic means for adjusting or regulating the force developed in the pneumatic column in accordance with the requirement of maintaining an uninterrupted condition of separation between the opposed surfaces irrespective of changes in the forces acting on the respective elements.

Still another object of the invention is to provide automatically operative means for maintaining an effective encapsulation of a desirable or unavoidable vibration preventing its migration to locations wherein its presence would be objectionable.

Still another object is that of redirecting the vibratory motion characteristically transmitted to such "second body in which the occurrence of vibration is objectionable," in prior art tripartite structures of the described type, and relocating the same in a special repository provided therefor, wherein such vibratory motion is effectively encapsulated against a further migration into its characteristic and objectionable location in such "second body."

A further object is that of providing a vibration repository of the character described in convenient mechanical association with the "second body" of the described tripartite structure, wherein the vibration ordinarily transmitted from the "desirably or unavoidably vibrating body" thereof is relocated and effectively encapsulated in the sense hereinabove indicated.

Still a further object is that of providing such a vibration repository, so associated with such "second body," comprising an oscillatory mass member for the actual containment of such relocated vibration.

Yet a further object is in the provision of a pneumatic paving breaker having a handle-equipped casing in which the occurrence of vibration is objectionable, incorporating a vibration repository as hereinbefore described, wherein substantially all of the vibration that would otherwise be communicated directly to such casing is relocated and encapsulated, thereby rendering the casing substantially vibrationless.

Figure 2:
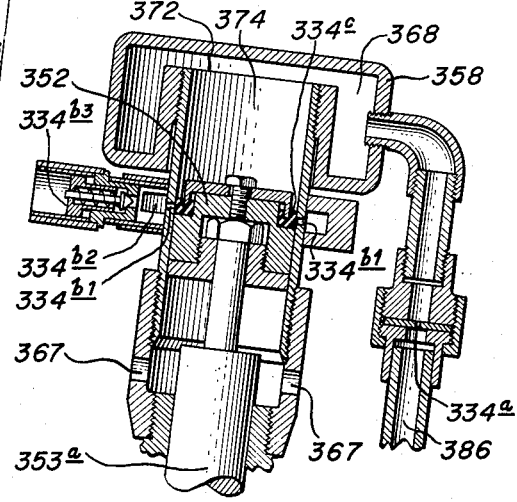

The foregoing discussion has made it clear that the present invention is intended to provide a fundamental solution to the problem of vibration elimination, comprehensively applicable to linear or 1-dimensional, planar or 2-dimensional, and solid or 3-dimensional vibrations of any character whatever. However, the embodiment of the invention illustrated in the drawing exemplifies this general solution to the problem of vibration elimination by its application to a common linear or 1-dimensional instance; but it will be understood that the usefulness of the principles so applied extends to cover also the 2- and 3-dimensional cases. In the drawing:

FIGURE 1 is a vertical sectional view of a vibrationless pneumatic paving breaker having a single casing hereinafter sometimes referred to as a "one-casing" tool, as contrasted with "two-casing" vibrationless paving breakers such as those disclosed in the aforementioned Patent No. 2,400,650; and FIGURE 2 is an enlarged, broken, vertical sectional view of a portion of the device illustrated in FIGURE 1.

*Anti-Vibrative Pressure-Force Counterbalancing System*

I will begin this explanation of the composition and operation of my invention by detailing a representative instance thereof depicted in FIG. 1 as a vibrationless percussive tool having the illustrative form of an improved hand-held paving breaker consisting of a vibration-eliminating oscillator structure combined with the casing, valve, and percussive piston parts of a pneumatically operated paving breaker structure, shown with reasonable accuracy for the sake of more specific illustration as being those of the "Thor 25" paving breaker made by the Thor Pneumatic Tool Company, which comprises a casing 1 providing a main cylinder 2 having therein a pneumatically actuated free-piston hammer 3, exemplifying, in the language hereinafter employed, an axially reciprocable blow-striking mass member. The casing has also handles T and provides an exhaust port or passage 322 to atmosphere for the cylinder 2, the upper end of which is occupied by a valve composition V, operative to direct the power-supplying flow of pneumatic fluid alternately to the lower and upper portions of the cylinder 2 to energize the reciprocatory cycle of the hammer 3 by applying upwardly and downwardly active axial pressure-forces alternately to the lower surface 3a and to the upper surface 3b thereof. It will be seen that the bottom cylinder-head surface consists only of the upwardly-facing surface of the annular shoulder defined around and having a sliding relation with the upper portion of an anvil element 4 and that the upper cylinder-head surface is made up of downwardly-facing surfaces of elements of the valve composition V; and these annular lower and aggregate upper cylinder-head surfaces are respectively denoted 2a and 2b.

As a convenience in terminology, any downwardly-facing surface or surface area which is comprised by or located in the vicinity of the upper closure of the main cylinder (or elsewhere therealong) and which, by virtue of extending transversely of and being exposed to pressure development in or otherwise connected or related for exact or approximate pressure-equalization with the upper portion of such cylinder, is adapted to receive pneumatically transmitted upwardly-directed axial reaction forces resulting from and operative simultaneously with the downwardly-directed pneumatic forces intermittently applied to the upper surface of the hammer to propel same through its downward reciprocations and also, by virtue of being defined on or carried by or otherwise suitably related to the casing structure, is further adapted to deliver such upwardly-directed reaction forces to the casing (exclusive of any portion or extension of such downwardly-facing surface or surface area made ineffective for such delivery of upwardly-directed reaction forces to the casing by the presence of an immediately opposite simultaneously pressurized casing surface of equal axially projected area, and specifically excepting any downwardly-facing surface defined on or carried by the casing and exposed to pressure developed in the upper portion of the cylinder which in entirety is thus made ineffective to deliver any such upwardly-directed reaction forces to the casing) will sometimes hereinafter be referred to as an upper reaction surface. Similarly, any upwardly-facing surface or surface area which is comprised by or located in the vicinity of the bottom closure of the main cylinder (or elsewhere therealong) and which, by virtue of extending transversely of and being exposed to pressure development in or otherwise connected or related for exact or approximate pressure-equalization with the lower portion of such cylinder, is adapted to receive pneumatically transmitted downwardly-directed axial reaction forces resulting from and operative simultaneously with the upwardly-directed pneumatic forces intermittently applied to the lower surface of the hammer to propel the same through its upward reciprocations and also, by virtue of being defined on or carried by or otherwise suitably related to the casing structure, is further adapted to deliver such downwardly-directed reaction forces to the casing (exclusive of any portion or extension of such upwardly-facing surface or surface area made ineffective for such delivery of downwardly-directed reaction forces to the casing by the presence of an immediately opposite simultaneously pressurized casing surface of equal axially projected area, and specifically excepting any upwardly-facing surface defined on or carried by the casing and exposed to pressure developed in the lower portion of the cylinder which in entirety is thus made ineffective to deliver any such downwardly-directed reaction forces to the casing) will sometimes hereinafter be referred to as a lower reaction surface. Such upper and lower reaction surfaces have relevance to the problem of preventing the usual upward and downward vibrations of a paving breaker casing for the reason that these casing vibrations are normally energized by the application of said pneumatically transmitted upwardly- and downwardly-directed reaction forces alternately to upper and lower reaction surfaces, as thus defined.

As an example, in accordance with this terminology, the downwardly-facing surface of the central valve stem in the valve composition V, which is exposed to pressure development in the upper portion of the main cylinder and is always pneumatically pressurized simultaneously with the upwardly-facing surface 3b of the hammer during each interval of its downward propulsion and which therefore during any such interval receives and transmits to the casing 1 a pneumatic pressure-force tending to propel the casing through an upward vibration, is to be classified as an upper reaction surface; and the same term applies to the downwardly-facing surface areas of the other elements of the valve composition V, seen to be annular and coaxially related to the stem, which are likewise effective when pressurized during any such interval of downward propulsion of the hammer to transmit to the casing forces urging it in an upward direction. Similarly, in accordance with this terminology, the aforesaid upwardly-facing annular lower cylinder-head surface 2a extending around the upper portion of the anvil at the bottom of the cylinder, which is exposed to pressure development in the lower portion of the main cylinder and is always pressurized simultaneously with the downwardly-facing surface 3a of the hammer during each interval of its upward propulsion and which therefore during any such interval receives and transmits to the casing 1 a force tending to propel it through a downward vibration, is to be classified as a lower reaction surface; and the same term applies to the upwardly-facing annular surface 6a, which is defined by the casing structure coaxially with and subjacent this upwardly-facing annular lower cylinder-head surface 2a to extend around the lower portion of the anvil, because, as will hereinafter be explained in greater detail with reference to the vertical passages 7a3 as a means of connecting this surface 6a for approximate pressure-equalization with the lower portion of the main cylinder, such surface 6a is also pressurized simultaneously with downwardly-facing surface 3a of the hammer during each interval of its upward propulsion and therefore is likewise effective during any such interval to transmit to the casing forces urging it in a downward direction. (An example of an upwardly-facing surface defined on the casing and exposed to pressure developed in the lower portion of the cylinder which in entirety is made ineffective to deliver downwardly-directed reaction forces to the casing by the presence of an immediately opposite simultaneously pressurized casing surface of equal axially projected area and which as aforesaid is to be excepted from classification as a lower reaction surface will be seen in the structure of FIG. 1 as the lower annular surface of the annular groove provided in the cylinder wall immediately above and circumjacent the upper face of the anvil 4; and an example of a portion or area which is comprised by a downwardly-facing surface defined on the casing and exposed to pressure developed in the upper end of the cylinder, and which because of being made ineffective to deliver upwardly-directed reaction forces to the casing by the presence of an immediately opposite simultaneously pressurized casing surface of equal axially projected area must be excluded as aforesaid from classification as upper reaction surface, is also disclosed in the same structure as the peripheral area of the downwardly-facing annular surface which forms the outer and major portion of the previously mentioned aggregate upper cylinder-head surface 2b, the peripheral portion thus referred to being more particularly that portion which close inspection of the drawing will show to be defined beyond the inside surface of the cylinder.)

Further to convenient terminology, the aggregate surface comprising the several downwardly-facing areas which are included in the valve composition V at the upper end of the main cylinder, and which are as aforesaid individually to be termed upper reaction surfaces, will sometimes hereinafter be referred to as the total upper reaction surface. It follows from this definition, with respect to any percussive tool conforming to the illustrative hammer-and-main-cylinder construction of FIG. 1 in employing pneumatic pressure developed in the upper portion of the cylinder to actuate a free-piston blow-striking element downwardly through a straight-line blow-stroke and in comprising an upper cylinder-head structure which is not perforated for the accommodation of a force-transmitting linkage making connection with external environment such as the anvil 4, that the axially projected area of the total upper reaction surface is equal to the axially projected area of the upper surface of such free-piston hammer; whence, in such a percussive tool further conforming to the illustrative construction of FIG. 1 in incorporating a main cylinder bore (and correspondingly, a hammer) of uniform diameter, the axially projected area of the total upper reaction surface is also equal to the single-valued cross-sectional area of such main cylinder bore.

Similarly, the aggregate of the axially projected areas of the two upwardly-facing annular surfaces 2a and 6a which are respectively defined by the casing structure at and subjacent the lower end of the main cylinder, and which are as aforesaid individually to be termed lower reaction surfaces, will sometimes hereinafter be referred to as the total lower reaction surface. And it follows from this definition, with respect to dimensionally variant percussive tools constructed in accordance with FIG. 1 so as to employ the pneumatic pressure developed in the lower portion of the cylinder for actuation of the free-piston hammer upwardly through a straight-line backstroke to also pressurize the surface 6a simultaneously with the surface 2a, that the axially projected area of the total lower reaction surface in any particular dimensional embodiment of such construction will be less than or equal to or greater than the axially projected area of the lower surface of such free-piston hammer, depending on whether, in that particular dimensional embodiment, the axially projected area of the surface 6a is zero (referring to designs not providing any such pressurizable surface subjacent the lower cylinder-head surface) or otherwise less than, or equal to, or greater than the area of the upper face 4a of the anvil 4.

The foregoing paragraphs will indicate the general applicability of the defined quantities, total upper reaction surface and total lower reaction surface, to a wide diversity of pneumatic percussive tool designs, but the specific practical embodiment of a vibrationless pneumatic paving breaker shown in FIG. 1 exemplifies the following preferred conditions and relations pertaining thereto:

(1) The main cylinder is of uniform diameter, whence
(2) the hammer is of uniform diameter and the axially projected area of the upper surface thereof is equal to the axially projected area of the lower surface thereof; and
(3) the axially projected area of the surface 6a defined on the casing is equal to the area of the upper face 4a of the anvil, whence
(4) the axially projected area of the total lower reaction surface is equal to the axially projected area of the lower surface of the hammer; and since the axially projected area of the total upper reaction surface is equal to the axially projected area of the upper surface of the hammer, it follows from (2) that
(5) the axially projected area of the total upper reaction surface is equal to the axially projected area of the total lower reaction surface.

It will be convenient hereinafter to employ the composite numeral 2a, 6a to designate the total lower reaction surface of the paving breaker structure depicted in FIG. 1. Correspondingly, the total upper reaction surface thereof will be denoted 2b. (The designation 2b has already been applied to the aggregate upper cylinder-head surface as hereinbefore described, which differs from the total upper reaction surface by including the previously mentioned peripheral area which close inspection of the drawing will show to be defined beyond the inside surface of the cylinder; but despite this difference no confusion can arise as between the obviously distinct terms, "total upper reaction surface 2b" and "upper cylinder-head surface 2b.")

Furthermore, as has already been stated, the specific practical embodiment of a vibrationless pneumatic paving breaker shown for the sake of more specific illustration with reasonable accuracy in FIG. 1 includes parts of a standard commercial paving breaker, and accordingly FIG. 1 is to be regarded as approximating a scale reduction of a dimensional drawing. The diameter of the main cylinder bore provided in the standard casing part which is represented in FIG. 1 is 2⅝ inches; and correspondingly, in the specific structure shown in FIG. 1, the axially projected area of the lower surface 3a of the hammer 3 is 5.4 square inches, the axially projected area of the upper surface 3b thereof is 5.4 square inches, the axially projected area of the annular lower cylinder-head surface 2a is 4.0 square inches, the area of the upper face 4a of the anvil 4 is 1.4 square inches, the axially projected area of the annular surface 6a surrounding the lower portion of the anvil is 1.4 square inches, the axially projected area of the total lower reaction surface is 5.4 square inches, and the axially projected area of the total upper reaction surface is 5.4 square inches. It will be understood that this numerical information given to but one decimal place of accuracy does not represent the refined tolerances held by the manufacturer of such standard commercial paving breaker parts, and is only intended for use in presenting hereinafter a representative quantitative discussion of the interrelation of the forces and counterforces which I have inventively employed to obtain the revolutionary result of eliminating casing vibration in pneumatic percussive tools.

Operative externally of the main tool casing 1 is an oscillator 320 which is reciprocable in its own cylinder or support structure 356 rigidly attached by clamps or other means, not shown, to the main tool casing 1 of which, therefore, such support structure may be considered an integral part. This oscillator element comprises a massive body or piston portion 354 and has upper and lower stems 353a and 353b extending coaxially from the upper and lower surfaces of said piston portion 354. These upper and lower surfaces of piston portion 354 thus respectively surrounding the stems 353a and 353b form annular shoulders 354a and 354b which are, respectively, approximately equal in area to the axially projected areas of the lower and upper surfaces 3a and 3b of the hammer 3. Evidently, then, the area of the upper annular shoulder 354a of the piston portion of the oscillator approximates 5.4 square inches, and the area of the lower annular shoulder 354b defined thereon also approximates 5.4 square inches. Furthermore, it will be seen that these annular shoulders 354a and 354b, which may properly be termed annular piston surfaces, are reciprocable relative to and in coaxial relation with the respectively opposing annular surfaces 364a and 364b carried by the casing, which may correspondingly be termed annular cylinder-head surfaces and are respectively equal in area to said annular piston surfaces 354a and 354b. Consequently, each of the annular cylinder-head surfaces 364a and 364b has an area of 5.4 square inches. These annular cylinder-head surfaces respectively located above and below the annular oscillator piston will sometimes be referred to hereinafter respectively as the upper counterbalancing surface 364a and the lower counterbalancing surface 364b in the explanation of their relationship to the aforesaid total lower and total upper reaction surfaces respectively located below and above the hammer 3 (or, for reasons subsequently to be explained, these same surfaces 364a and 364b may otherwise be respectively referred to as the total upper and total lower counterbalance or counterbalancing surfaces).

It will be observed in the drawing that the described oscillator-and-support composition is provided with certain flow connections for the communication of pneumatic pressure to the cylinder 356 comprised thereby and, more particularly, to the variable-volume annular spaces 356a and 356b which are respectively defined therein between the upper annular piston and cylinder-head surfaces 354a and 364a and between the lower annular piston and cylinder-head surfaces 354b and 364b. One such flow connection is established by means of a tube or passageway 7a1 opening at one end into the space 356a above the annular oscillator piston through the cylinder-head surface 364a defining the upper boundary of this space, and connecting at its other end with the longitudinal passageway 7a2 which is provided in the wall of the tool casing 1 to supply the actuating air to the variable-volume space under the hammer 3 in the main cylinder 2. A second such flow connection is established by means of a similar tube or passageway 7b opening at one end into the space 356b below the annular oscillator piston through the cylinder-head surface 364b defining the lower boundary of this space, and connecting at its other end with the variable-volume space above the hammer 3 in the main cylinder 2. Particular attention is directed to the fact that the two variable-volume spaces respectively defined above and below the hammer in the main cylinder 2 are in this way "cross-connected" with the two variable-volume spaces respectively defined above and below the annular oscillator piston in the oscillator cylinder 356 in the sense that it is the space below the hammer which is connected with the space above the oscillator piston while the space above the hammer is connected with the space below the oscillator piston.

The oscillator-and-support composition including the aforesaid oscillator cylinder and oscillator piston and the two variable-volume spaces respectively defined above and below the oscillator piston and thus cross-connected with the two variable-volume spaces respectively extending from the opposite ends of the hammer in the main cylinder, sometimes hereinafter referred to as the "oscillator structure," comprises a pneumatic force-counterbalancing structure which in attachment to the tool casing 1 is operative to prevent the same from developing the usual axial vibration resulting from the alternate application thereto of the upwardly- and downwardly-directed forces of reaction respectively associated with the alternately downwardly- and upwardly-directed pneumatic pressure forces actuating the reciprocatory motion of the hammer. And, as a matter of course, the vibration-eliminating operation of this oscillator structure includes two intermittent force-counterbalancing operations, one of which (A) successively develops downwardly-acting counterbalancing forces preventing the upward vibratory displacements of the casing ordinarily produced by such upwardly-directed reaction forces, and the other of which (B) alternately successively develops upwardly-acting counterbalancing forces preventing the downward vibratory displacements of the casing ordinarily produced by such downwardly-directed reaction forces.

I shall now proceed to set forth detailed explanations of these vibration-eliminating force-counterbalancing operations (A) and (B), and it will be understood that it was with the object of presenting these explanations in convenient numerical terms that I have hereinbefore specified the actual numerical values of the effective areas of the several piston and cylinder-head surfaces comprised by the illustrative paving breaker structure named above and depicted with reasonable accuracy in FIG. 1, and by the thereto attached oscillator structure which is also shown in that figure; and further to this object I shall additionally specify that the pressure of the energizing air delivered from the compressor through the usual pneumatic hose and fed therefrom into the tool through the recycling valve V to actuate the hammer and oscillator elements through their respective reciprocatory motions is 100 pounds per square inch, and shall then assume for the sake of simplifying the numerical argument that this 100-pound-per-square-inch pressure is not diminished by friction or expansion of the air as it progresses through the tool in the course of applying the actuating pressure forces to these reciprocating elements. (As a matter of fact, the assumption that the compressed air does not expand in actuating the parts of the illustrative paving breaker structure is less inaccurate than might be thought, inasmuch as it is one of the conventional principles of the air tool industry to attempt to maximize working speed by engineering designs directed to utilization of the full hose pressure undiminished by expansion to actuate the hammer entirely through each of its strokes just as though the actuating fluid were of a hydraulic instead of a gaseous character. It is because this ideal of design, directed to maximum working speed but opposed to economy in the use of air, is not fully realized in conventional compressed-air tools that the actuating compressed air sometimes has an observable expansion-cooling effect on some parts or portions of such tools.)

Now, in presenting an explanation of such force-counterbalancing operation (A) of the oscillator structure, which is repetitively effective to prevent the upward vibratory displacements of the casing, it is important to point out that the described oscillator structure provides a condition of equality between the effective areas of the annular cylinder-head surface 364b below the oscillator piston and of the total upper reaction surface 2b above the hammer, as has been hereinbefore implied by the foregoing statements that the area of such surface 364b equals 5.4 square inches and that the axially projected area of such surface 2b equals 5.4 square inches. As already stated, the recycling valve V located in and comprising part of the cylinder-head structure above the hammer 3 alternately feeds the compressed air into the pressurizable variable-volume spaces thereabove and therebelow to energize the reciprocatory motion thereof, and this explanation of the aforesaid force-counterbalancing operation (A) of the oscillator structure which is rigidly related to the main tool casing 1 refers to the first of these conditions, in which the compressed air is directed into and assumedly is pressurizing the upper end-space in the cylinder 2 above the hammer 3 with the full pressure supplied through the hose to apply a downwardly-directed accelerating force to the hammer, until the upper surface 3b thereof shall have sufficiently traversed the exhaust passage 322 in the downward motion of the hammer to permit the relatively sudden escape therethrough to atmosphere of the compressed-air contents of such upper end-space.

It follows, then, with respect to the first condition thus described and in consequence of the aforesaid particular numerical values of area and pressure, that the hammer 3 is accelerated downwardly toward the anvil 4 during each of the successive intervals in which this condition obtains by a pneumatic pressure force of 540 pounds, calculated as the product of the 5.4-square-inch axially projected area of the upper surface 3b of the hammer and the 100-pound-per-square-inch pressure effective within such upper end-space defined in cylinder 2 between the upper cylinder-head surface 2b and said upper hammer surface 3b; wherefore, in accordance with Newton's Third Law of Motion, there is developed simultaneously against the casing 1 an upwardly-directed axial reaction force of 540 pounds, similarly calculated as the product of the 5.4-square-inch axially projected area of the total upper reaction surface 2b and of said 100-pounds-per-square-inch pressure in the upper end-space which tends to propel the casing-and-handle structure (including the integrally related oscillator cylinder 356) through an objectionable upward vibratory displacement. And because the passageway 7b openly connects this upper end-space defined between the upwardly-facing hammer surface 3b and the downwardly-facing cylinder head surface 2b in the main cylinder 2 with the space 356b defined between the downwardly-facing surface 354b of the oscillator piston and the upwardly-facing cylinder-head surface 364b in the oscillator cylinder 356, it is apparent that whenever the aforesaid 100-p.s.i. air pressure is operative in said upper end-space of the main cylinder and is thus developing said 540-pound upwardly-directed axial reaction force against the total upper reaction surface 2b thereof, an equal pressure of 100 p.s.i. is operative in such lower end-space 356b of the oscillator cylinder and against the upwardly-facing cylinder-head surface 364b thereof, which, having a 5.4-square-inch area equal to the effective or axially projected area of said total upper reaction surface 2b of the main cylinder, is therefore urged downwardly by a force equalling and opposing said 540-pound reaction force acting upwardly against said surface 2b— while the equal and opposite reaction force of 540 pounds corresponding to and operative simultaneously with this downwardly-acting force developed against the bottom cylinder-head surface of the oscillator cylinder is disposed of by being upwardly applied by such 100-p.s.i. pressure operative in the lower end-space thereof to the 5.4-square-inch area of the bottom surface 354b of the oscillator piston, so that said downwardly-acting force developed against the bottom cylinder-head surface of the oscillator cylinder is not nullified by the upward delivery of the equal reaction force corresponding thereto against the composite casing of the tool and oscillator structure at some point thereon, and consequently remains effective to fully counterbalance and eliminate the vibration-producing tendency of the aforesaid 540-pound force acting upwardly against the total upper reaction surface 2b of the main cylinder 2 (which upwardly-acting 540-pound force, if not thus counterbalanced, would propel said composite casing through the usual objectionable upward vibratory displacement against the manual pressure exerted downwardly upon the handles T comprised thereby).

From the foregoing explanation of the force-counterbalancing operation (A), presented for the sake of convenience in illustrative numerical terms and on the basis of the over-simplified assumption that the values of the pressures operative against the piston and cylinder-head surfaces within the structure of FIG. 1 alternate instantaneously between full line pressure and atmospheric pressure without passing through any intermediate values, it will nevertheless be understood with reference to the actually continuous variation of these pressure values, that, ignoring the slight angle by which the axis of oscillator motion deviates from the axis of hammer motion and assuming that the oscillator motion remains confined to an intermediate segment of its maximum mechanically possible range of movement, the essential conditions for the theoretically complete elimination of such upward vibratory displacement of the composite casing, ideally regarded as a body axially free in space without any accelerative frictional force-connections with the oscillator, hammer, anvil or spike components reciprocable therein, are (1) that the condition of equality between the area of the lower counterbalancing surface 364b and the axially projected area of the total upper reaction surface 2b be exactly realized, and (2) that a relation of exact and absolutely simultaneously pressure-equalization be continuously effective between such two surfaces 364b and 2b throughout each cycle of the reciprocatory motion of the hammer.

Comprehension of the practical upward-vibratory-displacement-suppressing utility of the force-counterbalancing operation (A) from the foregoing explained thereof in idealized terms will be assisted by directing attention to the following minor physical factors which are either unavoidably or frequently involved in the actual employment of operation (A) in the functioning of practical vibrationless tools:

(1) Discrepancies from exactness in pressure-equalization between the surfaces 2b and 364b due to frictional pressure-drop and other pressure variations associated with pneumatic flow through the tube 7b.

(2) Discrepancies from absolute simultaneity of pressure-equalization between the surfaces 2b and 364b due to the limited flow velocity of the pneumatic fluid through the tube 7b.

(3) Discrepancies from exactness in the condition of equality between the area of the lower counterbalancing surface 364b and the axially projected area of the total reaction surface 2b which may conceivably arise from practical design requirements.

(4) Discrepancies from ideal zero value of angle between the hammer and oscillator axes due to practical design requirements.

(5) Discrepancies from the aforesaid ideal absence of frictional force-connections between the casing and reciprocable components comprised thereby.

It may be stated in general, in consequence of the obviously cyclic character of the operation of the FIG. 1 structure, that each of the foregoing enumerated discrepancies is cyclically and intermittently effective in causing small upwardly-directed forces or net forces to be applied to the casing which repetitively tend to propel it through small-amplitude upward vibratory displacements; and in greater particularity it may be stated that:

With regard to the discrepancies from exactness in and from absolute simultaneity of pressure-equalization between the surfaces 2b and 364b as noted respectively in the preceding paragraphs (1) and (2), such discrepancies are obviously controllable to small values having no practical significance by proper dimensional design of the tube 7b with respect to its length and inside diameters.

With regard to discrepancies in the condition of equality between the effective areas of the lower counterbalancing surface 364b and total upper reaction surface 2b, as noted above in paragraph (3), it is expected that the most frequent case in which such discrepancies might occur is that in which existing commercial tools already in use and representing some diversity in cylinder dimensions between various makes thereof are to be equipped for the counteraction of vibration therein with a dimensionally standardized oscillator attachment generally similar to the FIG. 1 oscillator structure, in contradistinction to the more important case of completely factory designed vibrationless tools in which the dimensions of such counterbalancing and reaction surfaces would normally be properly related, but even in the former case of attachable units such discrepancies may be expected to be relatively minor and of little practical significance because such dimensional diversity of such commercial tools, particularly those comprised in any single weight class thereof, is not very great.

With regard to discrepancies from the ideal zero value of the angle between the hammer and oscillator axes, as noted in the preceding paragraph (4), it may be stated that the exact value of any such angle has no critical merit, the only design requirement being that the angle remain sufficiently small so that the upwardly-acting reactive pressure force and the counterbalancing pressure force therefor are respectively exerted against the cylinder-head surfaces 2b and 364b in practically opposite directions in the sense that any reduction from full effectiveness of the counterbalancing force for preventing upward vibratory displacement of the casing be negligible, preferably according to the refined standard that any such displacement resulting therefrom be less than the least sensible value for such upward displacement; and such design requirement is readily satisfied, as will be made more apparent in numerical terms hereinafter.

With regard to discrepancies from the ideal absence of frictional force-connections between the casing and reciprocable components comprised therein, as noted in the preceding paragraph (5), it may be stated with reference to the hammer and oscillator elements that inasmuch as substantially no side thrust is developed in the course of the reciprocatory actuation of these elements it follows, from any assumed values of the coefficients of friction applying between these elements and the cooperating cylinder surfaces, that the respective axial forces frictionally transmitted because of the individual motions of these elements to such cylinder surfaces are extremely small, and moreover, since these respective frictional forces are operative in opposite directions during a large portion of the cycle of hammer motion, the vibratory effect thereof upon the casing is further reduced to negligible amplitudes by a canceling action therebetween; and with respect to the anvil and spike elements, which are actuated through comparatively very small-amplitude sliding motions relative to the casing structure by the sudden application of impact forces to them, the consequently very brief durations of the uni-directional movements of these respective elements are inadequate for the propulsion of the casing through upward displacements of sensible magnitudes by the relatively small-valued frictional forces operative for such brief durations between these respective elements and the casing.

It may be concluded from the foregoing discussion of the five noted discrepancies that, even according to the preferred refined standard for vibrationless performance that displacements of the casing be less than the least sensible value for such displacements, the attainment of complete elimination of upward displacements of the composite casing may be realized by correspondingly refined employment of appropriate dimensional and anti-frictional expedients to obviate such discrepancies; but it is a fact of important pertinence to the economical manufacture of vibrationless percussive tools incorporating the force-counterbalancing system under discussion that a positive use can be made of the absence of refinement in one of these items of discrepancy as a very inexpensive substitute for such refined employment of dimensional and anti-frictional expedients, namely, the previously mentioned frictional force-connection which is normally operative between the shank of the spike 9 above the collar thereof and the enclosing surface of the elongate casing passage slidably constraining such shank in coaxial alignment with the casing. For inasmuch as such frictional force-connection always acts, within the limitation of the amount of force frictionally transmissible by it, to rigidly oppose axial reciprocations of the casing relative to the spike element (except during the aforesaid negligibly brief intervals of acceleration of the spike through small-amplitude movements by the sudden application of impact forces thereto), it follows that during the remaining non-negligible portions of any continuous operating interval consisting of a number of cycles of the reciprocatory movement of the hammer, the casing will be rigidly stabilized against upward vibratory displacements relative to the stationary ground or paving surface which, during such non-negligible portions of the operating intervals, tends frictionally, or abuttively within the limit defined by the sum of the weight of the spike and any steady downpush force frictionally transmitted thereto from the casing, to hold the spike immobilized against upward movements away from such stationary surface, provided the maximum value of the algebraic sum of the other discrepant force terms tending to propel the casing through upward vibratory displacements remains less than such limited force frictionally transmissible through the spike to the casing.

It will be seen in consequence of this explanation of the casing-stabilizing utility of the frictional force-connection between the spike and casing that the refinement of the engineering treatment of the aforesaid upwardly active discrepant force terms in a production model of a vibrationless tool of the character described can be greatly relaxed without causing sensible upward vibratory displacements of the casing element, particularly since, if desired, the frictional force transmissible through such force-connection can be purposely increased at the discretion of design by simple brake means operative between the casing and the shank of the spike.

Proceeding now to an explanation of the previously mentioned force-counterbalancing operation (B) which functions alternately with the thus described operation (A) to prevent downward vibratory displacements of the casing, such operation (B) is exactly analogous to operation (A) and for that reason such explanation thereof will be limited to pointing out the corresponding elements in the analogy, as follows:

(1) Corresponding to the total upper reaction surface 2b which is effective in operation (A) to convert pressure developed in the upper portion of the cylinder 2 into an upwardly-directed axial reaction force tending to propel the casing through an upward vibratory displacement, the previously described total lower reaction surface 2a, 6a is similarly effective in operation (B) to convert pressure developed in the lower portion of the cylinder 2 into a downwardly-directed axial reaction force tending to propel the casing through a downward vibratory displacement.

(2) Corresponding to the lower counterbalancing surface 364b which is effective in operation (A) to convert pressure developed in the lower portion of the oscillator cylinder 356 into a downwardly-directed axial counterbalancing force, the previously described upper counterbalancing surface 364a is similarly effective in operation (B) to convert pressure developed in the upper portion of oscillator cylinder 356 into an upwardly-directed axial counterbalancing force.

(3) Corresponding to the condition of equality between the effective areas of the total upper reaction surface 2b and the lower counterbalancing surface 364b provided in connection with operation (A), a similar condition of equality between the effective areas of the total lower reaction surface 2a, 6a and the upper counterbalancing surface 364a is provided in connection with operation (B).

(4) Corresponding to the tube 7b which cross-connects the total upper reaction surface 2b and lower counterbalancing surface 364b for substantially exact and simultaneous pressure-equalization in operation (A), the composite passage 7a1—7a2—7a3 cross-connects the total lower reaction surface 2a, 6a and the upper counterbalancing surface 364a for substantially exact and simultaneous pressure-equalization in operation (B).

(5) Wherefore, corresponding to the cancellation in operation (A) of the tendency of the upwardly-directed axial reaction force noted in (1) to propel the casing through an upward vibratory displacement by the simultaneous action of the equal downwardly-directed axial counterbalancing force noted in (2), it follows that, in said analogous operation (B), the tendency of the downwardly-directed axial reaction force also noted in (1) to propel the casing through a downward vibratory displacement is similarly cancelled by the simultaneous action of the equal upwardly-directed axial counterbalancing force noted in (2).

(6) And finally it will be understood, with respect to the economical commercial production of a practical vibrationless tool, that the hereinabove decribed action of friction between the spike and casing elements in rigidly stabilizing the casing against minor upward displacements due to one or more of the five previously enumerated factors of discrepancy will correspondingly take place in reverse directional reference to rigidly stabilize the casing against minor downward displacements due to one or more of these same factors of discrepancy, so that excessively refined engineering directed to the correction of such discrepant factors is not necessary to such commercial production thereof.

The foregoing discussion has explained why substantially no upward or downward vibration of the casing results from the intermittent presence of charges of actuating air alternately in the spaces above and below the hammer.

At this point it is highly pertinent to state that a working model of this invention has been constructed in accordance with the structure of FIG. 1, and for purposes of clarification of the phrase "substantially no upward or downward vibration" appearing in the foregoing statement, I will report on the basis of actual test operation of the said working model in the demolition of heavy concrete slab that it so perfectly realized my heretofore explained counterbalancing theory as to make it almost impossible to detect by the sense of touch either any upward or downward vibratory displacements of the casing and handle structure of the tool, even when actuated with more than normal violence by compressed air pressures in excess of the usual 90 p.s.i. line pressure used to actuate tools of this character.

*Anti-Vibrative "Copivotality" Condition*

It will be noted that the structure of FIGURE 1, showing my vibration eliminating oscillator structure in external attachment to a conventional paving breaker, implies the feasibility of correctively applying such oscillator structure as an accessory to old paving breakers of the ordinary vibratory type which have already been put in regular use, for the purpose of converting such ordinary vibratory tools for vibrationless performance.

It will also be noted that such correction of old tools for vibrationless performance cannot be practically achieved by placing the type of oscillator structure shown, comprising the single, solid oscillatable mass 320 directly above the handle and backhead element in the theoretically ideal relation of coaxial alignment with the striking hammer 3 of the conventional tool thus to be converted, for the reason that such conventional tools are normally designed to approximate the greatest length that still permits an operator to lean forwardly over the tool for the purpose of pushing downwardly thereon to urge it against the work material, and it is obvious that thus locating the oscillator directly above the backhead would obstructively prevent the worker from assuming this desirable position.

This argument shows the necessity of securing the oscillator structure to the casing of the tool along a side thereof, but the resulting sideward displacement of the axis of reciprocation of the oscillator from the axis of reciprocation of the hammer gives rise to an additional problem in vibration control. If, for example, the sidewardly displaced oscillator axis is made parallel to the hammer axis, the displacement thereof in effect defines a sidewardly extending or radial lever arm equal in length to the distance between the axes and operative (assuming a relatively close sliding relation between the shank of the spike 9 and the tool casing) with respect to the fulcrum or pivot structure established by the seating of the spike point in the pit made thereby in the stationary concrete.

It is evident that the constraint afforded by this establishment of the spike point as a pivot element necessarily permits angular movements of the axis of the main body of the tool (i.e., the hammer axis) about such fulcrum or pivot location, and consequently the intermittent force of 540 pounds alternately applied upwardly against the cylinder head 364a and downwardly upon the cylinder head 364b, being effective at the end of such lever arm, will cause an angular vibration of the axis of the main body of the tool, which will result in a lateral or sidewise vibration of the handles thereof, notwithstanding the substantially complete elimination of vertical vibrations of the casing by the counterbalancing system hereinbefore described.

To solve this additional problem in the elimination of vibration in the casing and handle structure, I have introduced the special relative orientation of the oscillator and hammer axes depicted in FIGURE 1, wherein the aforesaid lever arm has been reduced to an effective length of zero, by the provision that the oscillator axis, as well as the hammer axis, contains the fulcrum or pivot location defined by the spike point, and accordingly this lateral vibration eliminating condition may be termed the "co-pivotal" relation of the hammer and oscillator axes.

In further explanation of this term "co-pivotal," it should be stated that whereas the condition of coincidence of the hammer and oscillator axes, shown for example in FIGURE 1 of my prior Patent No. 2,679,826, is accurately indicated by the terms "coaxial," "coaxiality," etc., and whereas the condition thus indicated is evidently to be regarded as a special instance of the "co-pivotal" condition just explained, so that the "co-pivotal" and coaxial conditions are not actually distinct, it will serve purposes of convenience to employ "co-pivotal" in a restricted sense to refer only to the cases in which the hammer and oscillator axes are not coincident. In practical applications the condition of coaxiality is generally more desirable, and in factory built tools embodying the described counterbalancing system, such condition can conveniently be provided by appropriate modification of design. However, where the special features of particular practical applications render attainment of the condition of coaxiality difficult or impractical, the counter-balancing system can be employed in a mechanical configuration embodying the alternative condition of "co-pivotality" to accomplish the substantially complete elimination of vibration, it being understood that the attainment of such excellent results depends upon limitation of the "co-pivotal angle"—i.e., the angle defined between the hammer and oscillator axes—to a sufficiently small value so that the cosine thereof approximates unity. For this reason, it will serve an additional purpose of convenience to further restrict the sense in which the term "co-pivotal" will be employed to have application only to cases in which this limitation of the co-pivotal angle in terms of the cosine thereof is realized.

I believe that in the descriptive matter hereinbefore set forth, I have made an understandable explanation of the force-counterbalance principles underlying my invention in pneumatic vibration-eliminating force-counterbalance systems of which the structure of FIG. 1 is, of course, only an illustrative instance, for it is evident that the counterbalancing or oscillator structure disclosed in FIG. 1 is readily adaptable to any vibration or recoil problem resulting from mass acceleration accomplished or accomplishable by gaseous energization means; which is to say, in the convenient terminology of the basic tripartite vibratile structure hereinbefore defined, that the force-counterbalancing system hereinabove set forth is generally employable, in cases in which actuation of the desirably or unavoidably vibrating component thereof is accomplished by gaseous pressure, to completely nullify the vibration-producing tendency of the reaction forces from such actuation simultaneously with their delivery to the component thereof in which vibration is objectionable—one such case, for example, being that of a one-cylinder free-piston engine to be made vibrationless, and another such case being that of a machine gun to be made vibrationless.

*Anti-Vibrative "Intermediacy" Feedback Control*

Notwithstanding this general applicability of my force-counterbalancing system, it will be convenient to continue to describe the innovations in mechanism required to secure its successful operation in terms of the specific paving breaker shown in FIG. 1, and these innovations include the entirely automatic control means referred to hereinbefore, a specific pneumatic exemplification of which appears in enlargement in FIG. 2. The need for such control means in conjunction with the force-counterbalancing system will be made apparent from a few physical observations related for convenience to the aforesaid specific exemplification thereof.

In the first place it is obvious, from the foregoing explanation of the force-counterbalancing actions used to prevent vibration of the casing and handle structure of the composition of FIG. 1, that the desired vibration-elimination counterbalancing action requires phases of operation within the reciprocatory cycle of the hammer 3 during which each of the surfaces 364a and 364b is pressurized by the hammer actuating pressure operative in the main cylinder 2 of the tool without the other one of these surfaces being simultaneously so pressurized, and in terms of structure, this requirement defines the necessary condition that a hermetic barrier of some sort be interposed between the said surfaces 364a and 364b.

In the second place it is obvious that this hermetic barrier in the course of maintaining pneumatic isolation between these alternately pressurized surfaces must necessarily be subject to reversing forces of the order of magnitude hereinbefore indicated by the illustrative figure 540 pounds, whence, in order to preserve the vibration-free condition established by the force-counterbalancing action, it is an additional necessary condition that the hermetic barrier be of such a nature and installed in such a manner that, notwithstanding its being subject to these strong reversing forces, it will not transmit any uncounterbalanced variable forces to the casing and handle structure.

In the third place, considerations of practical convenience mandatorially, in the case of portable or handle-held structures, and preferably, in most other cases, define the further condition that the means providing support for any such hermetic barrier against the action of such strong reversing forces be incorporated within the tripartite structure being treated for vibration elimination, in contra-distinction to any type of structural element connecting with and extending from such hermetic barrier to a point of attachment external of the tripartite composition.

Now it is easily shown by argument from the principles of mechanics that these three conditions define the requirement that the hermetic barrier employed be an oscillatable mass which with respect to the structure of FIG. 1, would be reciprocable between the surfaces 364a and 364b. And with the nature of the hermetic barrier thus definitely established as a hermetically sealed oscillator reciprocable between the aforesaid two surfaces which it pneumatically isolates, it is seen that its range of reciprocation must be limited so that it will not strike either one of these two surfaces, because impact action at either such surface would result in the delivery of uncounterbalanced forces to the handle and casing structure which would develop vibration therein. It will be seen that this requirement that the oscillator 320 not strike against the surfaces 364a and 364b is a special instance of the second necessary condition set forth in general terms above.

Furthermore, this condition that the oscillator not strike against the surfaces 364a and 364b makes it pertinent to consider that unless positively prevented from unlimited vertical wanderings, the range of reciprocation of the oscillator will inevitably become at times so greatly displaced from a generally central or intermediate location between the surfaces 364a and 364b as to bring the oscillator body 354 into impact engagement wtih one or the other of these surfaces, and it is obivous that the means effecting prevention of such wandering action must comprise some sort of suitably regulated force-transmitting linkage operative between the reciprocating oscillator and the desirably vibrationless composite casing structure containing the hammer and oscillator.

It is true that the previously disclosed intermittent and alternate supply of compressed air to the spaces 356a and 356b establishes a force-transmitting linkage between the oscillator and such composite casing structure, but this linkage not only is not regulated to suitably limit wandering of the reciprocatory range of the oscillator but, as will be explained in detail hereinafter, has a tendency to cause an upward wandering of this range positively bringing the oscillator into impact engagement with the surface 364a, wherefore it is evident that the required suitably regulated force-transmitting linkage must be other than the linkage so established by such intermittent and alternate air supply.

Anti-Vibrative Constant-Force Structure

Furthermore, in order to avoid the reintroduction of vibration into the composite casing structure by force variations delivered thereto through such additional force-transmitting linkage interconnecting such casing structure and reciprocating oscillator, it is necessary that such additional force-transmitting linkage be of such a character that the value of the force transmitted through it to the casing structure will remain substantially constant during each upward and each downward cyclic displacement of the oscillator respectively energized by the successive charges of air alternately supplied to the spaces 356b and 356a. This requirement that the oscillator and casing elements be interconnected by such an additional force-transmitting linkage developing therebetween a force value which remains substantially constant during each such cyclic displacement of the oscillator, but which at the same time is so regulated as to hold the range of such cyclic displacements in intermediate locations remote from both of these surfaces 364a and 364b, can be realized by combining constant force and feedback control means, and the following explanation of such combinative means is set forth in detailed reference to the specific structural exemplification thereof shown in FIG. 2.

This structural exemplification, which is also shown in FIG. 1 in relation to the tripartite vibratile paving breaker made vibrationless by the novel means herein disclosed, is seen to have a piston 352 extending upwardly from the top of the stem 353a above the enlarged central portion 354 of the oscillator. It will be seen that the enlarged central portion 354 of the oscillator is equipped with a downwardly extending stem 353b coaxial with the upper stem 353a. A cylinder 374 that slidably receives the piston 352 has escape holes 334b1 to atmosphere, and the uncapped upper end 372 of this cylinder opens into an annular tank 358 defining a constant pressure space 368 therein. The space below the bottom surface of the piston 352 is maintained at atmospheric pressure through the agency of the ports 367.

The escape holes 334b1 lead into an annular space 334b2 defined around the cylinder 374, in which annular space the escaping air is collected, whence it then exhausts to atmosphere through a spring biased valve 334b3. The spring biased valve and annular space 334b2 are optional and have simply the effect of preventing the pressure in the cylinder 374 and constant pressure space 368 from dropping below a predetermined value; for example, three pounds per square inch gauge. This provision secures the condition that the oscillator 320 will be held in its downmost position when the tool is not running, and prevents the first upward oscillations of the oscillator from carrying it so high as to impact its own upper cylinder head 364a. It is seen in FIG. 2 that a restricted orifice 334a drilled through a plate which is placed transversely across the infeed line 386 supplies air to the constant pressure space 368. The escape holes 334b1, annular collection space 334b2 and spring biased valve 334b3 comprise the exhaust to atmosphere of the "pneumatic brain," and in its entirety is designated with the numeral 334b.

It may be said that it is unnecessary that the cylinders actually be open ended. There could be a plate with a large or sufficiently large hole in it so that substantially no pressure gradients would develop in the reciprocating air flow between the cylinder space immediately above the piston 352 and the constant pressure space 368. The ideal condition is, of course, provided by the open ended constant pressure cylinder 374, as shown. The control action afforded by the thus described "pneumatic brain" and constant pressure structure is pneumatically energized by a high pressure (e.g., line pressure) inflow through the restricted orifice 334a, whence the flow passes, generally with a substantial pressure drop, into and through the composite space consisting of the constant pressure space 368 and space in the upper portion of the cylinder 374 above the piston 352, to commence its escape therefrom to atmosphere, whenever the position of piston seal 334c permits, through the plurality of small ports 334b1 in the wall of cylinder 374, which collectively comprise a considerably greater cross sectional area than the aforesaid restricted inflow orifice 334a.

This structure was necessary to keep the oscillator from striking against the cylinder heads 364a and 364b that close the cylinder in which it operates. The principal tendency of the oscillator in this respect is to rise during its oscillatory motion until it delivers a series of blows to the upper cylinder head 364a. The reason for this can be explained in terms of the forces acting on the hammer 3, in the following way. In the first place, the only forces acting on the top surface 3b of the hammer 3 to urge it downwardly are pneumatic—the force of gravity being ignored, because of the fact that the tool may be operated horizontally and also because the weight of the hammer is a negligible force compared to the force of 540 pounds urging it downward. It will therefore simplify the explanation by leaving out any discussion of gravity. It is then considered that the only force ever acting on top of the hammer is the intermittent pneumatic force which repetitively pushes it downward.

There is, of course, an intermittent pneumatic force alternately acting on the bottom surface 3a of the hammer to urge it upwardly in phase opposition to such intermittent downwardly acting force, but also there is a mechanical force which assists this upwardly-acting pneumatic force in urging the hammer upwardly. When the hammer strikes the anvil 4, the anvil is urged downwardly for an extremely brief interval by an extremely large force. This impact force may approach the value of 50,000 pounds for a brief interval. Action and reaction being equal, the hammer is therefore mechanically urged upward by this very large force during this very brief interval.

These considerations establish the further fact that the average value of the intermittent pneumatic force acting upwardly on the bottom surface 3a of the hammer must be less than the average value of the intermittent pneumatic force acting downwardly upon its top surface 3b, inasmuch as the mean position of the hammer remains fairly fixed during operation of the tool (since the structure of the tool prevents the hammer from shifting to a point above the cylinder head 2b or to a point below the cylinder head 2a). Further to this point, when the tool is operated over any long period of time, at the end of which it is observed that the hammer is still located intermediate the top and bottom cylinder heads, it is necessarily implied that the respective average values of all the forces acting downwardly on top of the hammer during that period and upwardly against the bottom of the hammer during that period were very closely equal. If this were not so, the change of the position of the hammer would be so extremely great that it could not remain confined within the longitudinal extent of the cylinder.

Accordingly, the average value of the variable total force acting under the hammer 3 (comprising the average value of the sum of the intermittent pneumatic force acting upwardly on the hammer and the intermittent mechanical force acting upwardly thereupon), must be almost exactly equal to the average value of the variable (and intermittent) pneumatic force acting downwardly on top of the hammer. Therefore, and since the average value of the momentary but very great impact force acting upwardly against the hammer, is a substantial value, it follows that the average value of the pneumatic force acting upwardly thereagainst must be substantially less than the aforesaid average value of the pneumatic force acting downwardly upon the hammer.

For example, suppose that the value of the impact force averaged over any interval comprising a considerable number of reciprocatory cycles is 50 pounds. Then since the sum of the average values of this upwardly-acting impact force and of the upwardly-acting pneumatic force, averaged over the same interval, is equal to the pneumatic force acting downwardly on the hammer, likewise averaged over the same interval, it follows that the average value of the pneumatic force acting above and downwardly upon the hammer is 50 pounds greater than the average value of the pneumatic force acting upwardly thereunder.

As explained heretofore in detail, the space 356a above the oscillator is in open communication with the space in the cylinder 2 below the hammer through the tube 7a1 and passage 7a2, whence the pressures active in the space above the oscillator and in the space below the hammer are substantially equal at any instant, and therefore so are the average values of the pressures in those spaces over any given interval. Similarly, the space 356b below the oscillator is in open communication with the space in the cylinder 2 above the hammer through the tube 7b, whence the average values of the pressures in those spaces must likewise remain substantially equal.

Then, in consideration of these respective equalities in terms of pressure, and the further fact hereinabove set forth that areas of the annular surfaces at the top and bottom of the oscillator body 354 are equal to each other and to the top and bottom areas of the hammer 3, it follows that the downwardly effective preponderance of the average value of the pneumatic force active upon the top of the hammer over the average value of the pneumatic force operative against the bottom of the hammer will be transposed and duplicated in numerical value as an upwardly effective preponderance of the average value of the pneumatic force acting on the bottom annular surface of the oscillator over the average value of the pneumatic force operative against the top annular surface thereof; and since the numerical value of that downwardly-effective preponderance affecting the operation of the hammer 3 was assumed to be 50 pounds, it follows that such upwardly-effective preponderance affecting the operation of the oscillator 320 would have the same numerical value of 50 pounds.

Because of the aforesaid upwardly-directed force-preponderance of 50 pounds, the oscillator exhibits a constant tendency to rise which if not arrested will result in its pounding against the upper annular cylinder-head surface 364a, and such pounding action would re-introduce an objectionable vibration into the casing 1.

To prevent this, I employ an additional surface on the oscillator against which sufficient pressure can be developed to hold the oscillator down whereby it can be made to operate over a reciprocatory range intermediate the ends of its maximum stroke, so that it will not strike the cylinder heads 364a and 364b respectively above and below the oscillator. This additional surface is the top surface of the piston 352 in the "pneumatic brain" and constant pressure structure comprising the previously specified elements 334a, 334b1, 334b2, 334b3 and 334c, together with the piston 352 and the continuous space within the tank 358 and cylinder 374.

The described "pneumaic brain" and constant pressure structure operates in such a way that if the oscillator 320 starts to oscillate about a mean position which is too high, causing a danger of impact thereby against the top cylinder head 364a, the seal 334c of the piston 352 will rise upwardly therewith to a position above the escape holes 334b1 in the cylinder 374, as is obvious, and best seen in FIG. 2. When this condition has become established, no further air can escape from the total continuous space comprising the constant pressure space 368 and the space in the cylinder 374 above the piston 352. And so long as this condition obtains, the high pressure compressed air being continuously fed through the restricted inlet orifice 334a into this total space cannot escape therefrom. Due to these two facts, the pressure in this total space will increase in value for as long as this condition continues; and, therefore, until this condition is discontinued, the piston 352 and the attached oscillator 320 will be urged downwardly with a steadily increasing pressure force.

This downwardly-acting pressure force will continue to increase until the oscillator is moved downwardly sufficiently far so as to uncover the escape holes 334b1 at least during a part of its reciprocatory cycle. If the oscillator and attached piston and piston seal structure should continue to be forced downwardly until the escape holes 334b1 remain uncovered during the entire reciprocatory cycle of the oscillator, the pressure drop in the total space above the "pneumatic brain" piston 352 will necessarily be rapid. In that case, the downwardly-acting pressure force on the upper surface of the piston 352, which assists in holding the upwardly-tending oscillator in an intermediate range of positions between the top cylinder head 364a and bottom cylinder head 364b, is consequently decreasing rapidly, and it will continue to decrease until it no longer gives sufficient assistance to the deficient pressure force acting on the upper surface 354a of the oscillator to hold it in the low position it has reached. Thereafter, the range of the reciprocatory motion of the oscillator will start to rise toward its stable intermediate location, in which the escape holes are again covered during a part of each cycle of reciprocation.

Our experience with this described structure shows that the extreme conditions of wandering migration of the piston seal 334c, above or below the escape holes 334b1, such that these holes are either closed or open during the entire reciprocatory cycle of the oscillator, are held to brief durations, with the range of its reciprocating movement exhibiting a strong tendency to remain stabilized in an intermediate location between and remote from the upper and lower cylinder heads 364a and 364b, in which comparatively stable location the escape holes 334b1 are closed off by the piston seal 334c during only a part of each reciprocatory cycle of the oscillator.

It should be understood that the successful operation of the "brain" in this particular structural design requires that it be thus able to quickly effect the required compensatory changes in the pressure acting downwardly on the surface of the piston 352. This statement stems from the fact that the average value of the mechanical impact force reactively delivered during any relatively short interval by the anvil 4 upwardly against the bottom of the hammer 3 is related to the strength and elastic properties of the concrete being encountered during that same interval by the point of the spike 9, and such qualities of the concrete are subject to rapid variations as the spike point progresses through the concrete aggregate.

For example, if the spike point engages a steel reinforcing bar in the aggregate, the aforesaid average value of the impact force will increase quite materially, and this condition of engagement can be either established or terminated almost instantly. Now it will be evident from the foregoing discussion that the average value of the pressure acting downwardly on the surface of the piston 352 must be equal, during any operating interval in which the oscillator remains within its intermediate range between the upper and lower cylinder heads 364a and 364b, to such average value of the impact force during that interval. Consequently, if such engagement is either established or terminated, it necessitates a corresponding and almost instant increase or decrease in the pressure applied against the upper surface of the piston 352. It will be clear that if the "brain" were not able thus to quickly make the required compensatory changes in the value of this pressure acting downwardly on the piston 352, then as the result of any such sudden increase in the average value of the impact force because of the spike point engaging a higher quality region in the concrete, the piston 352 and the attached oscillator body 354 would rise into a vibration-producing impact engagement with the upper cylinder head 364a.

It will be understood, however, that before the "pneumatic brain" can compensate for any such quick change in the quality of the concrete, the reciprocatory range of the oscillator will temporarily shift to an altered location or locations nearer one of the cylinder head surfaces 364a or 364b and more remote from the other thereby temporarily augmenting or diminishing the rate of efflux of air permitted through the holes 334b1 by the piston seal 334c from the total continuous space between the upper surface of the piston 352 and the restricted high pressure inflow orifice 334a until the required compensatory change in the pressure acting downwardly on the piston 352 has been effected.

Reference has been made hereinbefore to the deficiency of the average value of the pressure force acting downwardly upon the upper surface 354a of the oscillator, and, correctly stated, such deficiency during any operating interval is equal to the excess of the average value of the pressure force acting upwardly on the lower surface 354b of the oscillator over the average value of the pressure force acting downwardly on the upper surface 354a thereof, which in turn is equal to the average value of the impact force between the hammer and anvil during the same time interval. It has already been noted that variations in this pressure-force deficiency will be caused by variations in the quality of the concrete, and it should be further noted that any other variable factor likewise causing variations in the average value of the hammer-anvil impact force will produce corresponding variations in the pressure-force deficiency. Such variable factors, in addition to concrete quality, include the downpush exerted by the worker on the casing, the deviation of the main axis of the tool from the vertical, and the value of the actuating pressure delivered from the compressor.

It will be seen then that, in the normal use of the tool, the purpose of the "pneumatic brain" comprising the restricted infeed orifice 334a, the exhaust system 334b (which includes the ports 334b1, collection space 334b2 and valve 334b3), and the sealed piston 352 is to continuously regulate the supplemental pressure, which acts downwardly on the surface of the piston 352, so that it will quickly and accurately compensate variations in the deficiency of the average value of the pressure-force acting downwardly upon the upper oscillator surface 354a.

It will also be seen that the purpose of the relatively large pressurized continuous space comprising the constant pressure space 368 and the space within the cylinder 374 in open communication therewith (i.e., large as compared to the cyclic displacements of the piston 352) is to enforce the requirement that the "additional force-transmitting linkage interconnecting the composite casing structure and the reciprocating oscillator" be of such a nature that the value of the force transmitted through it to the casing structure will remain substantially constant during each cyclic displacement of the oscillator, whence it is apparent that such additional force-transmitting linkage consists in entirety of the sealed piston 352, the open-ended cylinder 374, and the said relatively large continuous space.

It will now be apparent that the desired combination of constant force and feedback control means is satisfactorily exemplified by the composite pneumatic structure hereinabove summarized in the two preceding paragraphs, in which structure the "pneumatic brain" component comprises the said feedback control means and in which such force-linkage component comprises the said constant force means. The reason for the inclusion of the sealed piston 352 in both of the foregoing enumerative descriptions respectively of the pneumatic constant force and pneumatic feedback components is that the piston 352 is a common element interrelating these components for feedback cooperation therebetween to control the position of the oscillator.

*Vibrationless Casing and Compensated Anvil Combination for Increasing Working Speed*

It has been previously stated herein that the improvement in working speed accomplished by the use of a compensated anvil is maximized by its use in conjunction with a vibrationless casing.

The fact so stated stems from the problem of properly seating the anvil upon the upper end of the spike for effective transmission thereto of the full energy content of the hammer blow, and for purposes of clarification, the distinction between such effective transmission of the blow energy through the anvil and the contrary case of its ineffective transmission therethrough will now be explained.

In the first place, it has been found in the demolition of concrete that any specific amount of blow energy delivered to the spike is much more effective for driving the spike into the concrete if concentrated into a single blow than if subdivided into a greater number of weaker blows totaling the same amount of energy.

To understand the distinction here being drawn between the concentration and subdivision of a given amount of blow energy, the anvil should be visualized in a "mid-air" position between the upper end of the spike and the downwardly facing shoulder defined on the lower surface of the cylinder head under the hammer as a retaining element for preventing the anvil from bouncing upwardly off the spike into a destructive occupation of the space between such lower cylinder head and the striking face of the hammer. In view of the almost perfect elasticity of the steel anvil and hammer components, the action which follows the delivery of the blow of the much heavier hammer to the relatively light anvil caught by the hammer in this "mid-air" position can then be sequentially visualized as follows:

First, the anvil will bounce downwardly from such "mid-air" position off of the bottom surface of the hammer with a velocity considerably higher than the hammer velocity (just as a highly elastic golf ball bounces with greater velocity off the advancing face of a golf club).

Second, by virtue of this greater downward velocity of the anvil, it will arrive at and bounce upwardly off of the upper end of the spike while the more slowly descending hammer, further reduced in speed by having thus elastically transmitted a portion of its energy to the anvil, is still at a relatively considerable distance above it.

Third, the anvil, inconsequence of thus bouncing upwardly off the spike, will return to meet and again impact with the hammer in a somewhat lower new "mid-air" position, after which there will be several repetitions of such sequential bouncing action between the hammer and anvil to define a number of successively lower "mid-air" positions of this sort.

Inasmuch as each repetition of such sequential bouncing action entails the delivery by the thus rapidly vibrating anvil of one impact upon the spike, transmitting thereto a parcel of energy obtained from the total amount of kinetic energy contained in the descending hammer before its initial impact with the anvil in its first-mentioned "mid-air" position, it is obvious that the described repetitive bouncing process causes that specific amount of blow energy to be subdivided into a number of weaker blows totaling the same amount of energy—thus, as hereinbefore stated, reducing the effectiveness of the total blow energy so subdivided for driving the spike into the concrete. This process of subdivision of the kinetic energy of the descending hammer may sometimes hereinafter be referred to as the rattling or bouncing degeneration of the blow energy.

This argument shows that, as a condition to maximum working speed, the anvil of a paving breaker should be seated in firm contact with the spike at the instant when the blow of the hammer is received by the upper surface of the anvil.

Furthermore, this desired condition will not be maintained without the operation of some special means for insuring it, because normally, or at least not infrequently, the immediate consequence of the delivery of the hammer blow to the anvil even when thus properly seated on the spike is the simultaneous bouncing of the hammer and anvil upwardly from their lowermost positions at the time of such impact delivery—whence it is not unusual for the anvil immediately after the instant of impact to become positioned in the objectionable "mid-air" location hereinbefore discussed, and in view of the fact that the force of gravity has only a negligible effect during the brief reciprocating cycle of the hammer to return the anvil from such "mid-air" location to seat the same firmly upon the spike before delivery thereto of the next hammer blow, it follows that such bouncing of a properly seated anvil off the spike will effectively prevent maintenance of the aforesaid desired condition that the anvil be firmly seated in contact with the spike at the instant when the hammer blow is delivered thereto unless particular means are provided for enforcing this condition.

One example of such a particular agency for keeping the anvil seated upon the spike is that which is used with the conventional or uncompensated anvil operative in the ordinary vibrating paving breaker structure. It will be understood that such uncompensated anvil comprises no pressurizable surface other than its upper impact-receiving surface which slidably projects through the lower cylinder head, in contradistinction to the compensated anvil hereinbefore described which, in addition to such pressurizable upper impact-receiving surface, comprises also a pressurizable downwardly-facing annular shoulder surface of equal area. Because of this fact, it will be seen that such ordinary or uncompensated anvil cannot receive any upwardly-directed pneumatic pressure force at any time during the operating cycle and, therefore, during each backstroke portion of the reciprocating cycle of the hammer when pneumatic pressure is applied to the lower surface thereof and consequently against the aforesaid upper pressurizable surface of the anvil, there will be delivered to the anvil a downwardly-directed pushing force, not diminished by any upwardly-directed pressure force and equal in value to the area of such upper surface thereof multiplied by the pressure thus utilized for upward acceleration of the hammer. In a typical paving breaker of ordinary design the area of such upper surface of the anvil is 1.4 square inches, whence, if the value of such pressure used to raise the hammer approximates 100 pounds per square inch in normal operation, the aforesaid downwardly-directed pushing force useful for firmly seating the anvil upon the spike before the delivery of the next hammer blow will have a value approximating 140 pounds.

The foregoing description of a particular pneumatic agency for keeping the anvil of a paving breaker seated upon the working spike has been introduced not only with the purpose of specifically illustrating such an agency but also because it is believed to define the state of the prior art with reference to the anvil-seating problem. This fact is stressed because there is a defect relating to working speed inherent in this prior art treatment of this problem, and it is one of the important objects of the instant invention to eliminate this defect, which I will describe in general terms by saying that the working speed of conventional paving breaker tools employing the described pneumatic anvil-seating expedient is substantially reduced by what I shall call a spreading degeneration of the downpush momentum supplied to the tool (or the downpush or output momentum delivered through the spike thereof to the concrete slab) which directly results from reliance on this expedient.

The involvement of considerations of momentum in paving breaker mechanics can best be understood by noting that although the quantity momentum is usually defined as the product of mass and velocity, it may be otherwise defined as the product of force and time. A convenient unit for measuring it in this latter way is the "pound-second" which term refers to the amount of momentum developed by the continuous exertion of a force of one pound during an interval of one second.

Visualization of any paving breaker, whether vibrationless or not, being used by a worker in its normal, nearly vertical position in the demolition of a ground-slab of concrete will bring to mind two sources of such downpush momentum being invested therein. Corresponding to the fact that, for example, the weight of a heavy-duty paving breaker may be 90 pounds, the action of gravity will invest therein $90 \times 60$ or 5,400 pound-seconds of downwardly-acting momentum during each operating interval of one minute. And the worker in pressing downwardly upon the handles of the tool with an average force assumed for the sake of example to be 70 pounds, will invest an additional amount of downward momentum equal to $70 \times 60$ or 4,200 pound-seconds in each such one minute operating interval. Accordingly, downward momentum is being fed into the operating paving breaker structure at a total rate of 5,400 plus 4,200 or 9,600 pound-seconds per minute.

Since the science of physics has demonstrated that momentum is a conserved quantity and cannot be destroyed (this statement being known as the Law of Conservation of Momentum), all of the momentum which is thus fed into the tool can be accounted for as the sum of a part thereof which remains stored in the mass of the tool and a second part thereof which passes therethrough to be invested elsewhere. Then, in consequence of the obvious fact that the tool remains in one place without acquiring any substantial traveling velocity during the perforation of a concrete slab, such fraction of the input momentum remaining stored therein is negligible, wherefore, corresponding to the fact that downward momentum is being supplied to the tool by the action of gravity and the pushing force of the worker at a rate of 9,600 pound-seconds per minute, it follows that the tool is simultaneously delivering downward momentum to some mass external of itself at the same rate.

This external mass must be the concrete slab being perforated by the action of the tool because the tool has no linkage with any other mass and is linked to the slab by the working spike for the delivery of downward force thereto and, therefore, over an interval of time, for the delivery thereto of downward momentum.

It has been shown in this way that the concrete slab is receiving downward momentum through the spike of the tool at a rate of 9,600 pound-seconds per minute. This fact does not, however, establish any definitely corresponding working speed, or even that any penetration of the slab is being accomplished. The truth of this latter statement will be appreciated by considering that the worker might, while keeping the tool inoperative during an interval of relaxation, rest thereon a portion of his weight equal to 70 pounds for an entire period of one minute, in which case it is obvious in the light of the foregoing explanation that the concrete slab would receive the full amount of 9,600 pound-seconds of downward momentum through the working spike during that period without the total force being transmitted thereto by the spike ever exceeding the 160-pound sum of the 90-pound casing weight and such 70-pound force contributed by the worker which sum is, of course, extremely insufficient to effect any penetration whatever of the slab by the spike point.

We are thus led to the interesting question of why the operating tool is capable of effecting penetration of the concrete slab while delivering thereto downward momentum at no greater rate than in this described case with the tool not operating.

It will readily be appreciated that the intervals of impact between hard steel objects such as the hammer and anvil are extremely brief and in order to make an illustrative argument, let it be supposed that during operation of the FIG. 1 structure, the duration of the hammer-anvil impact interval is approximately 0.0002 of a second. Then, assuming that the tool delivers hammer blows at the representative frequency of 1,200 per minute, it follows that the total impact time during one minute of operation is 1,200×0.0002 or 0.240 second.

Further assuming that the tool is so designed that it does not during its operation deliver any but negligible forces to the slab except during the 1,200 intervals of impact produced by it during one minute of operation, it then follows that the entire amount of 9,600 pound-seconds of momentum delivered by the tool to the slab in one minute must be delivered thereto in the aforesaid total impact time of 0.240 second.

The force value capable of delivering the 9,600 pound-second amount of momentum to the slab in this relatively brief total impact time can be calculated from the equation $F \times 0.24 = 9,600$, whence it is found that the impact force applied by the operating tool through the spike point to the slab is 40,000 pounds. It is understood that this high-valued demolition-producing force is intermittent and repetitive, and exists only during the extremely brief hammer-anvil impact intervals already noted as being only 0.0002 second in duration.

At this point it is pertinent to emphasize the fact that since the total time comprised by all 1,200 of these 0.0002-second impact intervals occurring in one minute of operation is only 0.24 second or $\frac{1}{250}$ of a minute, it is clear that during much the greater part of any such one minute operating period—namely during $\frac{249}{250}$ of that period—substantially no force is transmitted by the operating tool through the spike to the concrete slab.

Comparison of this condition with the conjectured inoperative condition during which the low-valued no-demolition-producing downward force of 160 pounds was applied throughout the entire 60 seconds of each one minute interval in which the operator leaned upon the tool suggests a simple answer to the foregoing question as to why the operating tool is effective to penetrate the concrete slab while the inoperative tool is not, although both are delivering momentum to the slab at the same rate of 9,600 pound-seconds in each one minute period—that is to say, the operating tool by virtue of thus "squeezing" the delivery time of this amount of momentum down to $\frac{1}{250}$ of the 60-second period in which it is delivered by the tool in the inoperative case, correspondingly magnifies the quantity of force with which this amount of momentum is delivered by the reciprocal factor of 250.

This simplified answer to the foregoing question is suggestive of the further fact that any paving breaker which operates in such a manner as thus to "squeeze" some but not all of the downward momentum gravitationally and manually delivered to it into brief impact intervals will have a working speed intermediate the zero working speed of an inoperative tool and the high working speed of a tool which operates in such a manner as thus to "squeeze" substantially all of the downward momentum received by it into short-duration impact intervals. In a word, it may be said of an operating tool which does not do this that it successfully magnifies only a part of the low-valued gravitational and manual downward force received by it into the required high-valued demolition-producing forces.

Accordingly, the working speed of any tool which fails thus to concentrate substantially all of its downward momentum delivery to the concrete slab into impact intervals can be improved as to working speed (and/or the manual downpush requirement) by the contrivance within it of means causing it to do this.

It will now be shown that the tool structure herein-before cited as exemplifying the prior art solution to the anvil seating problem, and illustratively described as utilizing a 140-pound pneumatic pressure-force during the backstroke portion of the reciprocatory cycle of the hammer to press the anvil downwardly into firm seating engagement with the top of the working spike, comes within this general definition of a tool susceptible to such improvement.

Considering the fact that in a properly designed tool of the prior art type the development of the pressure actuating the backstroke of the hammer commences immediately after each impact of the hammer upon the anvil and is discontinued before the following impact, and further considering that it is this backstroke pressure which applies the aforesaid pressure force pushing the anvil downward into seating engagement with the spike, it is seen that whatever downward momentum is fed by this pressure force through the anvil and thence through the spike to the underlying slab, is delivered thereto during time intervals entirely distinct from and having no overlapping relation with the 1,200 impact intervals occurring during each one minute operating period, whence it is clear that such prior art tool structure does fail to concentrate all of its downward momentum delivery to the slab into the impact intervals.

A simple calculation will show that the amount of the downward momentum thus delivered through the spike to the slab but not usefully concentrated into impact intervals for successful demolition action thereagainst comprises a substantial portion of the total of 9,600 pound-seconds of downward momentum per minute which the spike delivers to the slab.

The first step in this calculation is the assignment of a representative value to the duration of this pressure force which pushes downwardly upon the spike and anvil column, and since this pressure force is coexistent with the backstroke pressure which exerts it, the value assigned to its duration can be any representative value applying to the duration of the portion of one reciprocatory cycle defined between the successive instants of the impact of the hammer upon the anvil and of the next opening of the exhaust port by it during its ensuing upward movement at which latter instant the backstroke pressure ceases to exist.

Inasmuch as the backstroke pressure is terminated in this way somewhat before the completion of the backstroke with the hammer at its highest position in the cylinder, the duration of the backstroke pressure will be somewhat less than one-half of the duration of one complete reciprocatory cycle of the hammer which has been assumed to be delivering 1,200 blows per minute. In accordance with this assumption, the cycle time is 0.05 second; wherefore and from the foregoing considerations, the value of 0.023 second will be assigned as the duration of the pressure force exerted through the spike and anvil column upon the slab. Consequently, the total time during any one minute operating period in which the spike applies this downwardly-acting force to the slab is equal to 1,200×0.023 second of 27.6 seconds. Correspondingly, the number of pound-seconds of downward momentum delivered by the spike to the slab during such a one minute operating period is equal to the product of the 140-pound value of the force thus communicated to the slab and this total time of 27.6 seconds during which this force is active. Therefore, a total of 3,864 pound-seconds of downward momentum is delivered to the concrete between the hammer-anvil impact intervals during each one minute operating period. Since this figure represents 40% of the entire 9,600 pound-second amount of downward momentum fed through the spike to the slab during any such one minute operating period, it is clear that such prior art tool very signally does fail to concentrate substantially all of its downward momentum delivery to the slab within the intervals of impact, and is, therefore, susceptible to being improved in working speed, and/or by the reduction of the manual downpush requirement, by means effective to alter its operation so that such concentration of substantially all of its downward momentum delivery to the slab into impact intervals will occur.

With reference to the possible amount of improvement, in terms of a reduction in the manual downpush requirement, attainable by the use of such means resulting in such concentration of all of the downward momentum into the impact intervals, it is evident from the Law of Conservation of Momentum that a definite part of the manual downpush force applied to the tool corresponds to such 3,864 pound-second quantity of momentum that is uselessly and wastefully delivered to the slab, during each one minute operating period, by the aforesaid 140-pound anvil-seating pressure-force which acts between the intervals of impact. The value of this definite part of the manual downpush force which corresponds to this uselessly expended quantity of momentum can be calculated from the equation $60P=3864$, where P is such part of the downpush force expressed in pounds, and the coefficient 60 applied thereto represents such one minute operating period expressed in seconds. It is found then that P equals 64.4 pounds; and consequently, translating this result into mechanical terms, it follows that the application to any such prior art tool of means effective to eliminate the aforesaid 140-pound momentum-wasting anvil-seating pressure-force and to concentrate substantially all of the downward momentum delivery by the tool to the slab into the impact intervals, can be specified to accomplish a reduction of the manual downpush requirement from 70 to 5.6 pounds without any associated reduction in either the frequency or striking energy of the hammer blows, provided the employment of such means does not entail any deterioration of the anvil-spike seating relation as compared with such relation as theretofore effected by such 140-pound force pushing downwardly upon the anvil between the impact intervals.

Alternatively the elimination of the waste of such 3,864 pound-second quantity of momentum by the use of any such means concentrating substantially all of the downward momentum delivery of the tool into the intervals of impact can be employed as a basis for a dimensional redesign of the tool to be operated with a 70-pound manual downpush as in the unimproved conventional case, but with such ordinarily wasted 3,864 pound-second quantity of momentum comprised within a number of additional hammer blows of unaltered striking energy in each minute of operation. Since the amount of momentum in any such unaltered blow is equal to (9,600−3,864)/1,200 or 4.78 pound-seconds, the number of such additional hammer blows per minute which is attainable by such utilization of this previously wasted quantity of momentum is equal to 3,864/4.78 or 808. In other words, the incorporation, in an appropriately redesigned tool, of the desired means concentrating substantially all of its downward momentum delivery into the intervals of impact will result in a total output of 2,028 blows of undiminished striking energy per minute as compared with the ordinary figure of only 1,200 blows per minute obtainable without this type of improvement.

It is apparent that still a third way of taking advantage of the reclamation by such means of this ordinarily wasted part of the downward momentum output of the tool, amounting to about 40% thereof, is by suitably redesigning it to deliver an unincreased number of more powerful blows each comprising a 40% increase in its momentum content. This approach will yield 1,200 6.69-pound-second blows per minute as compared with the conventional output of 1,200 4.78-pound-second blows per minute. And since the striking energy varies with the square of the momentum content of the blow, such increase in the momentum of the individual blow by a factor of 1.4 provides a corresponding increase in its striking energy by a factor of 1.96. It should be noted, however, that the very great increase in working speed obtainable by thus substantially doubling the kinetic energy content of the blow, while holding the number of blows per minute to the ordinary value, is not available to the designer of vibratory tools of the conventional type, because the attendant increase in the amplitude of handle and casing vibration would make operation of the tool prohibitively disagreeable to the worker, and consequently, such increase in working speed is an advantage unique to tools of the vibrationless type brought into existence by my inventions in the field of vibration elimination.

The foregoing discussion makes it clear that these advantages obtainable separately in terms of greatly reduced manual downpush requirement, increased blow frequency, and increased blow energy, or in various design combinations of these factors involving selected degrees of improvement in each of them, are not obtainable in conjunction with the ordinary method of using the backstroke pressure for the creation of a pressure force to seat the anvil upon the spike, and it makes it clear also that this disadvantageous consequence of pressure-seating the anvil in this way is attributable to a partial spreading out of the delivery of the downward momentum transmitted through the spike to the concrete slab beyond the limits of the 0.0002-second impact intervals to define an equal number of the much longer 0.023-second intervals in which a substantial fraction of the total available downwardly-acting momentum is wastefully delivered to the slab in association with low-valued forces incapable of accomplishing any slab demolition.

It will be readily apparent in these terms why I introduced hereinabove the term "spreading degeneration" of the downpush momentum as a way of referring to the physical basis for the limited potentialities of the conventional tool with respect to the working speed attainable for a given value of manual downpush.

On the other hand, it has been shown that unless such pressure-seating of the lighter weight anvil or some substitute means therefor is employed to enforce its proper firmly seated relation with the top of the spike at the time of each blow delivery thereto by the much heavier hammer, the objectionable process of subdivision of the kinetic energy of the hammer blow, hereinbefore referred to as the "rattling or bouncing degeneration of the blow energy," will take effect to the detriment of the working speed.

In view of this explanation of the problem of working speed with respect to anvil function, it is evident that such objectionable spreading degeneration of the downpush momentum can be avoided without incurring the also objectionable bouncing or rattling degeneration of the blow energy if mechanical abutment means can be employed in very close juxtaposition with an anvil of the compensated type (which, as hereinbefore stated, continuously nullifies the pressure-seating force causing such spreading degeneration of the downpush momentum) in such a manner as to block upward bouncing displacements of the anvil away from the top of the spike without applying any substantial downward pushing force thereagainst between the successive instants of such blocking action, and I have found that a tool casing having the perculiar and valuable property of vibrationlessness provides such a means; for whereas the ordinarily strongly vibrating casing is not well adapted to being manually positioned to serve as such a closely positioned abutting element, the contrary is true of any vibrationless casing. That is to say, the worker can without difficulty continuously position such a vibrationless casing so that, for example, a shoulder defined on the bottom surface of the lower cylinder head—specifically, 6b in the vibrationless paving breaker structure of FIG. 1—will remain in close juxtaposition with the upper surface of the shoulder of a compensated anvil employed therein—the upper surface of the shoulder 5 in the FIG. 1 structure—so as to almost instantly block the upward bouncing displacements of the anvil—denoted 4 in the FIG. 1 structure—thereby preventing its attaining the aforesaid objectionable "mid-air" position, and maintaining it in effective impact-transmitting, approximately seated relation with the spike.

The efficacy of the described novel combination of a compensated anvil with a vibrationless casing can be further appreciated by considering the efficiency-destroying cooperation between such a compensated anvil and a vibratory casing, whereby the necessary closely sealed compensated anvil, if it should at any time become properly seated upon the spike, would then, during the next descent of the hammer, be frictionally lifted off of the spike and into the aforesaid objectionable "mid-air" position by the corresponding vibratory ascent of the casing, before receiving the impact of the descending hammer in such "mid-air" position to commence the "rattling" degeneration of the kinetic energy contained therein, as hereinabove explained.

In other words, a casing of the vibratory type, in addition to the consequent difficulty of manually holding it in a substantially abuttive relation with a compensated anvil employed therein to maintain the same in proper impact-transmitting relation with the spike, has also the disadvantage of vibratively raising the anvil therefrom into such "mid-air" position to commence this degeneration of the blow energy.

This reference to the anvil in effective impact-transmitting, approximately seated relation with the spike is intended to indicate the practical fact that although the anvil should ideally be firmly seated upon the spike for maximum effectiveness of impact-transmission thereto, the deterioration in such effectiveness resulting from slight separations between the spike and anvil at the instant when the hammer strikes the anvil may be treated as immaterial, for the reason that, in such a case, the successive impact-force deliveries to the spike resulting from the bouncing action of the anvil between the advancing hammer and spike are practically coincident and insofar as the elastic reactions of the concrete are concerned are substantially equivalent to a single blow.

From the foregoing detailed discussion of anvil function and related operating characteristics, it will be appreciated that an important object of my invention, in addition to the several objects thereof initially set forth herein, is that of providing a practical and workable solution to the problem of maximizing the working speed of a percussion tool comprising a striking hammer, an impact-transmitting anvil, and an externally extending work member, insofar as concerns the behavior of the anvil therein; and in greater particularity, is that of providing such a solution to this problem by the useful combination of a compensated anvil with a vibrationless casing to effect the simultaneous elimination of rattling or bouncing degeneration of the blow energy and spreading degeneration of the downpush momentum in the operation of such a tool.

General Considerations

Although I have specifically exemplified my anti-vibrative counterbalancing system with the paving breaker structure of FIG. 1 comprising a single, solid oscillatable mass so oriented as to provide the described co-pivotal relation between the hammer and oscillator axes, I have also referred in general to the sometimes more desirable condition of coaxiality between these axes as being easily attainable in factory built tools, and it will be obvious that insofar as concerns successful operation of my counter-balancing system in such a coaxial case the axis of the oscillatable mass is properly to be considered as the line along which the center of gravity of such mass reciprocates regardless of whether it is comprised by a unitary reciprocable element (such as the aforesaid ring-shaped oscillator of Patent No. 2,679,826) or by a plurality of reciprocable elements having their several reciprocatory movements so constrained that the path of motion of the center of gravity of these elements considered collectively must coincide with the hammer axis throughout the complete operating cycle of the tool. And whereas such a system of constraints can be associated with various configurations of the several axes of the hammer and such oscillatable elements, it will suffice for purposes of illustration to mention one such configuration, namely that incorporated in a "twin oscillator" construction comprising two identical oscillators of the same weight having parallel axes in the same plane as and equidistant from the hammer axis.

Accordingly, I shall employ the term "total oscillator mass" in a generalized sense to refer to all of the mass which is effective, in the manner hereinbefore explained, as a "hermetic barrier" between surfaces adapted to be separately pressurized to produce anti-vibrative force-counterbalancing action, regardless of whether such mass is comprised integrally, or in the form of such twin oscillators, or in any other multiple form.

It will be apparent that since the "total oscillator mass" may thus comprise a number of individual piston-like oscillator elements, there must be in any such case an equal number of respectively corresponding downwardly-facing cylinder head surfaces respectively located thereabove, and in addition thereto an equal number of respectively corresponding upwardly-facing cylinder head surfaces respectively located therebelow, so as to constitute each such oscillator element a "hermetic barrier," in the sense hereinabove explained, between and with respect to a pair of opposed, separately pressurizable surfaces employed in producing anti-vibrative, force-counterbalancing action as aforesaid.

Furthermore, since such "hermetic barrier" may also be sealingly related to these opposed pressurizable surfaces by other than piston and cylinder structure to produce such counterbalancing action, it will be convenient to refer to any such opposed surfaces as "counterbalance surfaces," the two such surfaces comprising any such pair being distinguished by the respective terms "upper counterbalance surface" and "lower counterbalance surface."

Accordingly, and analogously with the matter of the preceding paragraphs respecting oscillator mass, I shall employ the term "total upper counterbalance surface" to designate all of the downwardly-facing surface above and pneumatically isolated by the total oscillator mass in its previously described capacity as a "hermetic barrier," regardless of whether such surface is comprised integrally or in multiple form; and similarly, I shall employ the term "total lower counterbalance surface" to designate all of the upwardly-facing surfacing below and pneumatically isolated by the total oscillator mass in its said capacity as a hermetic barrier, regardless of whether such surface is comprised integrally or in multiple form.

It has already been made clear that one essential condition of the illustrated embodiment of my anti-vibrative force-counterbalancing system is that the area of the total upper counterbalance surface be approximately equal to the effective area of the lower cylinder head of the main cylinder containing the striking hammer, which, as heretofore noted, totals the areas of the two pressurizable surfaces 2a and 6a whereby the downwardly-directed reaction force, associated with the upwardly-directed pneumatic force actuating the backstroke of the hammer, is communicated to the handle-equipped casing (but, because of the operation of this essential condition, without the objectionable consequence of producing a downward vibration of the casing).

Accordingly, and consistently with the foregoing terminology relating to the pressurizable surfaces above and below the oscillator mass, it will be convenient to refer to any such effective lower cylinder-head surface, regardless of whether it is comprised integrally or, as in the present case, in multiple form, by the previously defined term "total lower reaction surface." In these terms, then, the aforesaid one essential condition can be stated very simply by stating that the area of the "total upper counterbalance surface" must be approximately equal to the area of the "total lower reaction surface." Or, in more fundamental terms relating directly to force, it is one basic condition of my anti-vibrative force-counterbalancing system that the two forces respectively active in one direction against the total lower reaction surface and in a generally opposite direction against the total upper counterbalance surface be approximately equal.

Then, a coordinate essential condition of the illustrative embodiment of my force-counterbalancing system is that the area of the "total lower counterbalance surface" must be approximately equal to the area of the "total upper reaction surface," employing this term to refer to the effective cylinder-head area opposed to the aforesaid "total lower reaction surface"—in the drawing, the surface 2b properly to be considered as having the same area as the cross-sectional area of the hammer. Or, again translating into more fundamental terms relating directly to force, it is a second basic condition of my anti-vibrative force-counterbalancing system that the two forces respectively active in one direction against the total upper reaction surface and in a generally opposite direction against the total lower counterbalance surface be approximately equal.

And whereas I have illustrated my anti-vibrative force-counterbalancing system in application to a mechanism incorporating only a single desirably or unavoidably vibrating element (the hammer 3) exhibiting linear vibration only, it will be evident that more complex mechanisms incorporating several such unavoidably vibrating elements, not necessarily having their respective axes of vibration relatively oriented in any particular manner, can be similarly treated for vibration elimination; and with respect to any such complex mechanism, the aforesaid two basic conditions of my anti-vibrative force-counterbalancing system can be conveniently restated as the single requirement that corresponding to each such total reaction surface facing in a particular direction and receiving a variable force perpendicularly thereagainst there be a generally oppositely-facing total counterbalance surface receiving perpendicularly thereto a continuously substantially-equal variable force.

It will be understood that in any such complex structure, the relative locations and angular orientations of all such reaction and counterbalance surfaces incorporated therein will be so assigned in relation to the respective masses of the several reciprocating elements comprised thereby as to establish or practically approximate the hereinbefore discussed conditions of coaxiality or co-pivotality, or other angular-vibration avoiding or suppressing condition, so that neither translational nor angular vibrations will be active therein. It should be borne in mind that the condition of co-pivotality can be realized in a properly planned configuration of any number of oscillating masses, and if the number thereof is greater than two, the condition of coplanarity of their axes of reciprocation is optional.

In discussions concerning both simple and complex structures anti-vibratively treated with my force-counterbalancing system, it is in many instances convenient to use the term "along" to describe the movement of an oscillating mass, either unitary or composite, relative to the axis of another such oscillating mass in the system, it being understood that this term is used in a sufficiently general sense to include instances both of such realization of and practical approximation to the aforesaid conditions of co-pivotality and coaxiality.

In the explanation I have given of the reciprocatory behavior of the oscillator element 320, it was made clear that this element may and usually will simultaneously exhibit two distinguishable reciprocatory motions, which are respectively (1) a comparatively rapid short-stroke reciprocation energized by the same alternately and oppositely applied pneumatic pressures which maintain the reciprocatory cycle of the striking hammer (observed during actual operation of the FIG. 1 structure, at representative pressures and against particular concrete test slabs, to be about 0.75 inch), and (2) a slower long-stroke reciprocation of a highly random character produced by the relatively gradual adjustments effected by the regulatory action of the "pneumatic brain" in the value of the constant pressure occupying the closed space above the piston 352 carried by the oscillator (simultaneously observed to vary between lesser values approximately one inch and a maximum value approaching three inches depending on the degree of the nonhomogeneity of the concrete aggregate). Accordingly, it will be convenient to use the terms "cyclic reciprocatory motion" and "random reciprocatory motion" of the oscillator, or sometimes otherwise the "cyclic oscillations" and "random oscillations" thereof, to respectively denote such oscillator motions (1) and (2).

The foregoing discussion has also made it clear that the reason for applying the term "constant" to the aforesaid pressure occupying the space above the piston 352, notwithstanding these adjustments effected by the "pneumatic brain" in the value thereof in the course of such gradual random reciprocation of the oscillator, is to designate the characteristic vibration-eliminating property of this pressure, which is not sufficiently varied by and during the individual displacements of such cyclic reciprocatory motion of the oscillator, and of the piston 352 carried thereby, to transmit noticeable vibration to the handle and casing structure.

As will be recalled, the term average value has been applied herein in reference to certain intermittent forces developed by pneumatic pressure and by impact action, and it should have a helpfully clarifying effect to explain how the cyclically repeated state of non-existence of any such force implied by the use of the term "intermittent" with respect thereto is accounted for in the numerical quantity arrived at as such average value thereof. A convenient form of explanation can be presented in terms of the total number of pound-seconds of momentum developed by the intermittent exertion of such a force during any operating interval in which it is alternately of a substantial value and of the zero value corresponding to such "state of non-existence," by stating generally that such average value is arrived at by weighting equally each instant in such interval during which the value of the force is zero with each instant therein during which the force has a particular value other than zero, and, more specifically, that such "average value" is equal to such total number of pound-seconds of momentum divided by the duration, expressed in seconds, of that entire continuous interval including all such instants when the value of the force is zero or other than zero. Thus, for example, the "average value" of the intermittent pneumatic force which repetitively actuates the backstroke of the hammer, calculated for a 1 minute interval of operation, is equal to the number of pound-seconds of upward momentum invested in the hammer by such force during all (e.g., 1200) of the backstroke movements thereof in the course of such operating interval divided by 60.

The fact that the pneumatic force specified in this example as actuating the backstroke of the hammer is simultaneously duplicated as a substantially equal force acting downwardly on the oscillator, together with the further fact that the alternately active pneumatic force actuating the downstroke of the hammer is simultaneously duplicated as a substantially equal force acting upwardly on the oscillator, may appear to imply as between the respective reciprocatory motions of the hammer and oscillator that an opposite phase relation obtains, and in any case directs attention to the topic of phase relation as between these two elements. As a matter of convenience, the reciprocatory cycle of the hammer will be considered to commence and to end with the bottom-of-stroke position of the hammer in impact engagement with the anvil, and correspondingly, the reciprocatory cycle of the oscillator will be defined as commencing and ending with the top-of-stroke position of the oscillator.

In these terms, and referring again to the subject of phase relationship between the hammer and oscillator, it can be conveniently explained that the hammer and oscillator cycles thus defined are not exactly coincident, because no counterpart of the hammer-anvil impact engagement which abruptly arrests the downward movement of the hammer is operative to co-instantaneously terminate the upward movement of the oscillator, and consequently a time displacement separates the commencing (and also the terminating) instants of the hammer and oscillator cycles. Therefore, and because it has been found that this time displacement does not normally bring the top-of-stroke position of the oscillator into time coincidence with the top-of-stroke position of the hammer, it follows that neither an opposite-phased nor a same-phased relation normally obtains between the oscillator and hammer motions. Accordingly, I shall employ the term "intermediate phase" to designate the aforesaid time displacement relationship obtaining between the reciprocatory cycles of the hammer and oscillator elements.

In conclusion, it may be helpful to explain with specific reference to the parts of the vibration-less tool of FIG. 1, how the composition thereof exemplifies the desired, widely applicable, modified tripartite structure comprising a desirably or unavoidably vibrating body, a second body in which the occurrence of vibration is objectionable, and an automatically adjustable force-transmitting linkage interconnecting such two bodies and devised, in accordance with The Basic Proposition of Vibration Elimination herein enunciated, so as to be capable of transmitting at any particular time only the single-valued force for which this linkage is then adjusted by an automatically operative feedback adjunct thereto, so regulating such one transmissible force-value as to prevent the sufficiently close approach of the vibrating body to such first-mentioned body as to reintroduce vibration therein by a vibratory striking action thereagainst or by any other form of stop-and-rebound action therewith.

Referring then to FIG. 1 for the purpose of detailing and clarifying this exemplification, and therefore permissibly ignoring the operating combination of the hammer 3 and oscillator 320 therein because the hereinbefore described force-counterbalance system effectively disassociates this combination from the discussion, it is apparent that the illustrated structure consists of an unavoidably vibrating body exemplified by the piston 352, a second body in which the occurrence of vibration is objectionable exemplified by the composite casing and handle structure including the main tool casing 1 and handles T thereof, together with the oscillator cylinder 356, cylinder heads 364a and 364b thereof, the cylinder and tank elements 374 and 358, etc., and an automatically adjustable force-transmitting vibration-eliminating linkage interconnecting such two bodies exemplified by the variable-length gaseous column contained in cylinder 374 and developing axial thrust between the piston 352 and the top wall of the tank 358 and transmitting only the single-valued force defined as the product of the area of the piston 352 and the particular value to which the constant pressure active in the column is adjusted, by automatically operative feedback means exemplified by the composition including the infeed orifice 334a, the exhaust system 334b, and the piston seal 334c, so as to prevent a sufficiently close approach of the piston 352 assembly to elements of such second body to communicate vibration thereto by striking action.

From a different point of view, not ignoring but focusing on the hammer and oscillator elements, the vibration-less tool of FIG. 1 exemplifies an apparatus comprising a casing containing a plurality of reciprocable masses and made vibrationless by realization of the basic counterbalancing condition that the algebraic sum of the reaction forces transmitted to such casing, in consequence of the reciprocatory actuation of such masses, remain substantially constant during each operating cycle of such apparatus.

While in the foregoing specification embodiments of the invention have been set forth in considerable detail for purposes of making a complete disclosure thereof, it will be apparent to those skilled in the art that numerous changes may be made in those details without departing from the spirit and principles of the invention.

I claim:

1. In combination with apparatus having a vibratory element, an element in which the occurrence of vibration is undesirable and connecting linkage for effectuating a necessary transmission of force therebetween, means for automatically adjusting the value of such transmitted force to maintain a predetermined relation between the vibratory and second-mentioned elements, and means for maintaining any such adjusted value relatively constant throughout any cycle of the vibratory motion of said vibratory element.

2. In combination with apparatus having a vibratory element, a second element in which the occurrence of vibration is objectionable, and connecting linkage for effectuating a necessary transmission of force therebetween, means for restricting the value of such force communicable through said linkage to a relatively constant value throughout any cycle of the vibratory motion of said vibratory element, and feedback means for regulatively altering such constant value during a sequence of such cycles to maintain a predetermined operational relation between the aforesaid two elements.

3. The combination of claim 2 in which said elements define relatively reciprocable opposed portions between which said transmitted force is operative, and in which said predetermined operational relation is one of normally continuous separation between said elements in the direction of such reciprocation whereby the transmission of vibration to said second element by repetitive stop-and-rebound action between said vibratory and second elements is prevented.

4. The combination of claim 3 in which said connecting linkage utilizes a gaseous medium interposed between said opposed portions for transmitting said force therebetween.

5. The combination of claim 4 in which said feedback means comprises a means for automatically varying the pressure in said gaseous medium 6. In vibration-elimination structure of the character described, the combination of a pair of relatively reciprocable elements consisting of a vibratory element capable of simultaneously displaying both cyclic and random reciprocations and a second element in which the occurrence of vibration is objectionable, said elements providing relatively reciprocable opposed surfaces and being required to have a substantially continuous condition of impact-preventing separation therebetween during proper operation of the structure, means defining a pressurizable enclosure and means for establishing therewithin a gaseous column extending between said opposed surfaces and transmitting a force between said elements, the volume of said enclosure being so related to the cyclic increases and decreases in the volume of said column produced by the cyclic reciprocations of said vibratory element that substantially no change in pressure occurs within said enclosure because of such cyclic reciprocations of the vibratory element, including means for automatically adjusting the pressure within said enclosure in relation to the random reciprocations of said vibratory element so as to maintain the said required condition of separation between said elements.

7. The apparatus of claim 6 in which said last-mentioned means comprises means for continuously supplying gas under pressure to said enclosure, means for permitting the escape of gas from said enclosure, and means for regulating the relative rates of such escape and supply of gas so as to selectively increase or decrease the pressure therein so as to maintain the said required condition of separation between said elements.

8. The structure of claim 6 in which said pressurizable enclosure is provided with an inlet adapted to communicate with a source of gas under pressure and with an exhaust outlet, and in which said automatic adjusting means includes a seal member carried by said vibratory element to traverse said outlet and maintain a selectively variable control over the rate of exhaust flow therethrough.

9. In a vibration-elimination structure of the character described, a pair of relatively reciprocable elements consisting of a vibratory element capable of simultaneously displaying both cyclic and random reciprocations and a second element in which the occurrence of vibration is objectionable, said elements providing relatively reciprocable opposed surfaces and being required to have a substantially continuous condition of impact-preventing separation therebetween during proper operation of the structure, means defining a pressurizable enclosure and means for establishing therewithin a gaseous column extending between said opposed surfaces and transmitting a force between said elements, the volume of said enclosure being so related to the cyclic increases and decreases in the volume of said column produced by the cyclic reciprocations of said vibratory element that substantially no change in pressure occurs within said enclosure because of such cyclic reciprocations of the vibratory element, and means for automatically adjusting the pressure within said enclosure in relation to the random reciprocations of said vibratory element so as to maintain the said required condition of separation between said elements, such automatic adjustment means comprising inlet means and outlet means for admitting and exhausting gas respectively to and from said enclosure, and means responsive to such random reciprocations for selectively varying the ratio between the average rates of flow respectively through such inlet means and through such outlet means.

10. In structural combination, a pair of elements related for variable-stroke relative reciprocatory movement and adapted to being loaded with a force subject to random variations which tends to actuate said elements in such relative movement in one direction, a pneumatic pressure linkage coupling said elements for the transmission of an opposing force therebetween maintained by such linkage at a substantially constant value during any such reciprocatory movement, and means for automatically adjusting such constant value as necessary to provide substantially simultaneous counterbalance for the contemporary value of such loading force.

11. The combination of claim 10 in which one of said elements provides a pair of abutment surfaces spaced apart in the direction of such relative movement and in which the other of said elements provides respectively opposed surfaces therewith defining the extreme range of such movement, and in which such substantially simultaneous counterbalance between the constant force and loading force is normally operative to restrict such relative movement to a lesser range intermediately located within such extreme range so as to prevent the stop-and-rebound transmission of vibration-producing amounts of momentum between said elements.

12. The combination of claim 11 in which such automatic adjustment means comprises feedback means controlled by and controlling the location of said intermediate lesser range within said extreme range.

13. In a percussive tool having a casing in which the occurrence of vibration is undesirable, a hammer reciprocable within said casing for the successive intermittent delivery of impact force to a work member, means for reciprocating said hammer by the application of forces alternately against the respective opposite ends thereof whereby respectively corresponding reaction forces are alternately developed in opposite directions on said casing tending to vibrate the same, the force tending to reciprocate said hammer in a direction away from its impact relation with such work member being in part impact reaction force developed against said hammer during the actual interval of impact, an oscillator reciprocable with respect to said casing generally along the reciprocatory axis of said hammer, means for reciprocating said oscillator in force opposition to the reciprocatory movement of said hammer whereby counteractive reaction forces are developed that oppose said reaction forces tending to vibrate said casing, said oscillator being dimensioned and arranged so that said counteractive reaction forces approximately equal said reaction forces tending to vibrate the casing, means for supplementing the forces causing reciprocation of said oscillator by applying thereto, generally in the direction of motion of said hammer immediately before the delivery of impact force to such work member, a continuous force, and means for varying the value of said continuous force over a relatively large number of impact cycles in accordance with changes in the average value of said impact reaction force intermittently operative against said hammer.

14. In a pneumatic percussive tool having a casing in which the occurrence of vibration is undesirable, a hammer reciprocable within said casing for the successive intermittent delivery of impact force to a work member resulting in the simultaneous development against the hammer of an equal and opposite impact reaction force, means for reciprocating said hammer by the application of pneumatic forces alternately against the respective opposite ends thereof whereby corresponding pneumatic reaction forces are alternately developed in opposite directions upon said casing tending to vibrate the same, an oscillator reciprocable with respect to said casing generally along the reciprocatory axis of said hammer, pneumatic force means for reciprocating said oscillator in force opposition to the reciprocatory movement of said hammer whereby counteractive pneumatic reaction forces are developed in opposition to said pneumatic reaction forces tending to vibrate the casing, said oscillator being dimensioned and arranged so that such counteractive pneumatic reaction forces approximately equal said pneumatic reaction forces tending to vibrate the casing, and means for supplementing the forces causing reciprocation of said oscillator by applying thereto, generally in the direction of motion of said hammer immediately before the delivery of impact force to such work member, a continuous force substantially equal in average value to the average value of said impact reaction force intermittently operative against said hammer.

15. The percussive tool of claim 14 in which automatic means are provided to enforce such equality between the average values of said continuous force and said impact reaction force despite variations in the average value of the impact reaction force occurring in any continuous operating interval comprising a substantial number of impact cycles.

16. The percussive tool of claim 15 in which said automatic means comprises a feedback system relating changes in the average value of said continuous force to displacements of the reciprocating oscillator caused by changes in the average value of said impact reaction force so as to increase the average value of said continuous force when the oscillator is thus displaced toward impact engagement with said casing in one direction, and to decrease the average value of said continuous force when the oscillator is thus displaced toward impact engagement with said casing in the opposite direction.

17. The percussive tool of claim 16 in which the means providing said continuous force includes means for maintaining the value thereof substantially constant during the reciprocatory movement of said oscillator corresponding to one reciprocatory cycle of said hammer.

18. The percussive tool of claim 16 in which the means providing said continuous force includes means for preventing the development of vibration-transmitting variations in the value thereof during the reciprocatory movement of said oscillator corresponding to one reciprocatory cycle of said hammer.

19. In a pneumatic percussive tool having a casing in which the occurrence of vibration is undesirable, a hammer reciprocable within said casing for the successive intermittent delivery of an impact force to a work member resulting in the simultaneous development against the hammer of an equal and opposite impact reaction force, means for reciprocating said hammer by the application of pneumatic pressures alternately against the impact-delivering lower face and upper face thereof whereby corresponding pneumatic reaction forces are alternately developed in opposite directions upon said casing tending to vibrate the same, an oscillator reciprocable with respect to said casing generally along the reciprocatory axis of said hammer and providing upper and lower faces having axially projected areas approximately equal respectively to the similarly projected areas of said lower and upper faces of said hammer, means for reciprocating said oscillator by the application of pneumatic pressures alternately against said upper and lower faces thereof and coordinately operative with said means for reciprocating said hammer so as to maintain a condition of substantially simultaneous equality between the values of the pressures respectively acting upwardly against said lower face of the hammer and downwardly upon said upper face of said oscillator and also between the values of the pressures respectively acting downwardly upon said upper face of the hammer and upwardly against said lower face of said oscillator thus continuously providing counteractive pneumatic reaction forces substantially nullifying said pneumatic reaction forces tending to vibrate said casing, and means for supplementing the forces causing reciprocation of said oscillator by applying thereto, generally in the direction of motion of said hammer immediately before the delivery of impact force to such work member, a continuous force substantially equal in average value to the average value of said impact reaction force intermittently operative against said hammer.

20. The percussive tool of claim 19 in which automatic means are provided to enforce such equality between the average values of said continuous force and said impact reaction force despite variations in the average value of the impact reaction force occurring in any continuous operating interval comprising a substantial number of impact cycles.

21. The percussive tool of claim 20 in which said automatic means comprises a feedback system relating changes in the average value of said continuous force to displacements of the reciprocating oscillator caused by changes in the average value of said impact reaction force so as to increase the average value of said continuous force when the oscillator is thus displaced toward impact engagement with said casing in one direction, and to decrease the average value of said continuous force when the oscillator is thus displaced toward impact engagement with said casing in the opposite direction.

22. The percussive tool of claim 21 in which the means providing said continuous force includes means for maintaining the value thereof substantially constant during the reciprocatory movement of said oscillator corresponding to one reciprocatory cycle of said hammer.

23. The percussive tool of claim 21 in which the means providing said continuous force includes means for preventing the development of vibration-transmitting variations in the value thereof during the reciprocatory movement of said oscillator corresponding to one reciprocatory cycle of said hammer.

24. An anti-vibrative accessory adapted for use with a pneumatic percussive tool having a casing defining a cylinder containing a piston reciprocated therein by an alternate application of pressure to the opposite ends thereof which simultaneously produces a reactive vibration of the casing, said accessory comprising an oscillatable element, a support structure for said oscillatable element defining therewith pressurizable spaces thereabove and therebelow respectively varied in volume by the oscillatory movement thereof, said support structure tending to vibrate reactively during the oscillatory actuation of said oscillatable element and being adapted to be affixed to such vibratory casing with the axis of movement of said oscillatable element extending generally along the axis of reciprocation of such piston, connecting linkage for effectuating a necessary transmission of force between said support structure and oscillatable element, means for restricting the value of such force communicable through such linkage to a relatively constant value, feedback means for regulatively altering such constant value to maintain a predetermined operational relation between said support structure and oscillatable element, and means adapted to alternately pressurize said spaces for actuating said oscillatable element in force opposition to such pneumatically actuated reciprocatory motion of the piston to effectuate a condition of anti-vibrative counterbalance between such tool casing and said support structure so oriented and affixed thereto.

25. In combination with a pneumatic percussive tool having a casing defining a cylinder containing a piston reciprocated therein by an alternate application of pneumatic pressure to the upper and lower ends thereof which simultaneously tends to produce reactive vibration of the casing, an oscillatable element, a support structure for said oscillatable element defining therewith pressurizable spaces thereabove and therebelow respectively varied in volume by the oscillatory movement thereof, said support structure tending to vibrate reactively during the oscillatory actuation of said oscillatable element and being secured to said casing with the axis of movement of said oscillatable element extending generally along the axis of reciprocation of said piston, connecting linkage for effectuating a necessary transmission of force between said support structure and oscillatable element, means for restricting the value of such force communicable through said linkage to a relatively constant value, feedback means for regulatively altering such constant value to maintain a predetermined operational relation between said support structure and oscillatable element, and means for alternately pressurizing said spaces for actuating said oscillatable element in force opposition to such pneumatically actuated reciprocatory motion of said piston to effectuate a condition of anti-vibrative counterbalance between such tool casing and said support structure secured thereto.

26. The combination of claim 25 in which said means for alternately pressurizing said spaces above and below said oscillatable element comprises separate conduits respectively interconnecting said spaces with the lower and upper end portions of said cylinder.

27. In a percussive tool, a casing providing a cylinder having end closures respectively defining upper and lower reaction surfaces, a hammer reciprocable within said cylinder between said reaction surfaces, means for applying fluid pressure alternately between the respective ends of said hammer and the respectively opposing reaction surfaces to reciprocate said hammer and a force-counterbalancing system comprising a pair of opposed counterbalancing surfaces oriented in respective opposition to the aforesaid reaction surfaces, a hermetic barrier interposed between said counterbalancing surfaces, and means for applying fluid pressure alternately against said counterbalancing surfaces substantially equal in value to and simultaneous with the fluid pressure application against the respective reaction surfaces opposed thereby, each of said reaction surfaces and the counterbalancing surface opposed thereby having approximately equal areas.

28. The percussive tool of claim 27 in which means are provided for preventing the transmission of substantial uncounterbalanced vibration-producing force variations between said barrier and said casing.

29. In a pneumatic percussive tool, a casing in which the occurrence of vibration is undesirable providing a main cylinder therein, and upper and lower end closures therefor, the axis of said cylinder being taken as the longitudinal axis of the casing and regarded for the purposes hereof as oriented vertically, an impact-receiving-and-transmitting member coaxially slidable in said casing and extending upwardly into said main cylinder through and in sealing relation with the lower end closure thereof, a free-piston hammer reciprocable within said cylinder for the successive intermittent delivery of an impact force to the upper face of said impact-receiving member resulting in the simultaneous development against the impact-delivering lower face of the hammer of an equal and opposite impact reaction force, said cylinder having adjacent the ends thereof total lower and total upper reaction surfaces related to said casing for the axial transmission of pressure-force thereto, means for developing pneumatic pressures intermittently and alternately in the lower and upper end spaces of said cylinder respectively defined between the lower face of said hammer and such lower reaction surface and between the upper face of said hammer and such upper reaction surface and so applying alternating oppositely-directed axial forces to said hammer whereby it is reciprocated and corresponding axial reaction forces are applied alternately against said lower and against said upper reaction surfaces tending to vibrate said casing, said casing defining a counterbalance cylinder with its axis oriented generally along the axis of said main cylinder and end closures therefor providing upper and lower counterbalance surfaces having areas which, when considered in projection along the axis of said main cylinder, are approximately equal respectively to the similarly projected areas of said total lower and total upper reaction surfaces, a hermetic barrier comprising a free-piston oscillator reciprocable within said counterbalance cylinder, a flow conduit connecting the upper end of said counterbalance cylinder with the lower end of said main cylinder for simultaneously transferring said intermittently active pressures developed in the lower end space and against said lower reaction surface thereof to said upper counterbalance surface and a second flow conduit connecting the lower end of said counterbalance cylinder with the upper end of said main cylinder for simultaneously transferring said alternately active intermittent pressures developed in the upper end space and against said upper reaction surface thereof to said lower counterbalance surface, said casing defining an independently pressurizable control cylinder therein coaxial with said counterbalance cylinder and operatively related to composite means for effectuating a necessary transmission of force between said casing and oscillator without an associated transmission of noticeable vibration therebetween and for maintaining a relatively continuous condition of impact-preventing axial separation between said casing and said oscillator in its upward and downward movements, said composite means comprising a control piston carried by said oscillator for reciprocating movement within said control cylinder and having an upwardly-facing pressurizable surface, an opposed simultaneously pressurizable surface provided by said casing and located adjacent the upper end of said control cylinder, an enclosure openly connected with said control cylinder adjacent said opposed pressurizable surface and comprising with the cylinder space between said opposed surfaces a sufficiently great unitary pressurizable volume so that substantially no increase in the value of the pressure therein acting axially between said upwardly-facing pressurizable surface of the control piston and said opposed surface provided by the casing will be compressionally produced by the maximum possible upward stroke of said piston toward such point of open connection, inlet means and outlet means for admitting and exhausting gas respectively to and from said unitary volume, and means for varying the ratio between the average rates of flow respectively through such inlet means and through such outlet means in relation to variable upward and downward displacements of the reciprocating oscillator caused by changes in the average value of said impact reaction force, so as to increase the average value of the pressure in said unitary volume when the oscillator is thus displaced upwardly toward said upper counterbalance surface and to decrease the average value of said pressure therewithin when the oscillator is thus displaced downwardly toward said lower counterbalance surface.

30. The pneumatic percussive tool of claim 29 in which said means for varying the ratio between the average rates of flow comprises a valve system controlled by the variable upward and downward displacements of said reciprocating oscillator and variably controlling the rate of flow through one of said respective means for admitting and exhausting gas to and from said unitary volume.

31. In a pneumatic percussive tool, a casing in which the occurrence of vibration is undesirable providing a main cylinder therein, the axis of said cylinder being taken as the longitudinal axis of the casing, an impact-receiving-and-transmitting member coaxially slidable in said casing and extending upwardly into said main cylinder through and in sealing relation with a suitably formed annular lower end closure for said cylinder provided by said casing which also provides an upper end closure therefor, a free-piston hammer reciprocable within said cylinder for the successive intermittent delivery of an impact force to the upper face of said impact-receiving member resulting in the simultaneous development against the impact-delivering lower face of the hammer of an equal and opposite impact reaction force, said cylinder having adjacent the ends thereof total lower and total upper reaction surfaces related to said casing for the axial transmission of pressure-force thereto, means for developing pneumatic pressures intermittently and alternately in the lower and upper end spaces of said cylinder respectively defined between the lower face of said hammer and such lower reaction surface and between the upper face of said hammer and such upper reaction surface and so applying alternating oppositely-directed axial forces to said hammer whereby it is reciprocated and corresponding axial reaction forces are applied alternately against said lower and against said upper reaction surfaces tending to vibrate said casing, said casing providing therein a coaxial cylindrical chamber located above an annular bottom end closure for the same also provided thereby and below said annular lower end closure of the main cylinder, said slidable impact-receiving member extending through and below said chamber in sealing relation with the annular bottom end closure thereof and having an outwardly extending annular shoulder intermediate its ends and reciprocable within said chamber in sealing relation with the walls thereof, the axially projected areas of the lower surface of said annular shoulder defined on said slidable member and of the upper impact-receiving face thereof being approximately equal, a flow conduit connecting the lower end of said chamber with the lower end of said main cylinder for the simultaneous development of substantially equal pressures therein, means establishing atmospheric pressure in the upper end of said chamber, said total lower reaction surface comprising the thus simultaneously pressurizable surfaces of the annular lower end closure of said main cylinder and of the annular bottom end closure of said chamber located therebelow, said casing defining a counterbalance cylinder with its axis oriented generally along the axis of said main cylinder and end closures therefor providing upper and lower counterbalance surfaces having areas which, considered in projection along the axis of said main cylinder, are approximately equal respectively to the similarly projected areas of said total lower and total upper reaction surfaces, a hermetic barrier comprising a free-piston oscillator reciprocable within said counterbalance cylinder, a flow conduit connecting the upper end of said counterbalance cylinder with the lower end of said main cylinder for simultaneously transferring said intermittently active pressures developed in the lower end space and against said lower reaction surface thereof to said upper counterbalance surface and a second flow conduit connecting the lower end of said counterbalance cylinder with the upper end of said main cylinder for simultaneously transferring said alternately active intermittent pressures developed in the upper end space and against said upper reaction surface thereof to said lower counterbalance surface, said casing defining an independently pressurizable control cylinder therein coaxial with said counterbalance cylinder and operatively related to composite means for effectuating a necessary transmission of force between said casing and oscillator without an associated transmission of noticeable vibration therebetween and for maintaining a relatively continuous condition of impact-preventing axial separation between the upper and lower counterbalance surfaces defined by said casing and the respectively opposed surfaces of said oscillator during the upward and downward movements thereof, said composite means comprising a control piston carried by said oscillator for reciprocating movement within said control cylinder and having an upwardly facing pressurizable surface, an opposed simultaneously pressurizable surface provided by said casing and located adjacent the upper end of said control cylinder beyond the point of farthest normal upward travel of said control piston, an enclosure openly connected with said control cylinder at a point above such point of farthest normal upward travel of said control piston and comprising with the cylinder space between said opposed surfaces a sufficiently great unitary pressurizable volume so that substantially no increase in the value of the pressure therein acting downwardly upon said upwardly-facing pressurizable surface of the control piston and upwardly upon said opposed pressurizable surface provided by the casing will be compressionally produced by the maximum possible upward stroke of said piston toward such point of open connection, inlet means and outlet means for admitting and exhausting gas respectively to and from said unitary volume, and means for varying the ratio between the average rates of flow respectively through such inlet means and through such outlet means, in relation to variable upward and downward displacements of the reciprocating oscillator respectively caused by increases and decreases in the average value of said impact reaction force, so as to increase the average value of the pressure in said unitary volume when the oscillator is thus displaced upwardly toward impact engagement with said upper counterbalance surface and to decrease the average value of said pressure therewithin when the oscillator is thus displaced downwardly toward impact engagement with said lower counterbalance surface.

32. The pneumatic percussive tool of claim 31 in which said inlet means and outlet means respectively comprise an inlet port system and an outlet port system, and in which said means for varying the ratio between the said average rates of flow comprises a seal member variably positioned by the variable upward and downward displacements of said reciprocating oscillator for varying the effective cross-sectional area of one such port system.

33. The tool structure of claim 32 in which said seal member is comprised by said control piston for traversing cooperation with said one port system.

34. The tool structure of claim 33 in which said one port system is said outlet port system.

35. The combination of a frame structure subject to the application of a vibratory force tending to cause vibratory movements thereof but in which vibratory motion is objectionable, an oscillatory mass carried by said frame structure so as to permit movement thereof in the direction of such vibratory force and in which vibration is not objectionable, and means for developing a synchronously varied pneumatic force reproducing such vibratory force applied to said frame structure in a transposed antivibrative reapplication thereto, the corresponding identically varying but oppositely-directed reactive pneumatic force being applied to said oscillatory mass, whereby vibratory motion which ordinarily would be developed by said first-mentioned vibratory force is effectively rerouted from an element in which the occurrence of vibration is objectionable and delivered to and collected within an element in which its occurrence is not objectionable.

36. The combination of claim 35 in which said frame structure is provided with a cylinder, and in which said oscillatory mass comprises a free piston reciprocable therewithin.

37. In combination with a frame structure in which the occurrence of vibration is objectionable, a necessarily vibrating mass carried thereby, means for applying a vibratory actuating force against said mass simultaneously producing a vibratory reactive force applied against said frame structure tending to initiate and maintain vibration therein, an oscillatory mass carried by said frame structure for movement generally along the axis of motion of said necessarily vibrating mass and in which the occurrence of vibration is not objectionable, and means for developing in relation to said vibratory reactive force a synchronously varied force reproducing the same in a transposed counterbalancing re-application to said frame structure, the identically varying oppositely-directed force developed by reaction from such transposed counterbalancing force being actuatively applied to said oscillatory mass, so that the vibratory motion ordinarily developed by reaction from the application of such a vibratory actuating force to such a necessarily vibrating mass is effectively rerouted from the frame structure in which the occurrence of vibration is objectionable and delivered to and collected within the oscillatory mass in which its occurrence is not objectionable.

38. The combination of claim 37 in which said frame structure is provided with a main cylinder, and in which said necessarily vibrating mass is a piston reciprocable therewithin.

39. The structure of claim 38 in which said frame structure is provided with a second cylinder, and in which said oscillatory mass comprises a piston reciprocable therewithin.

40. The structure of claim 39 wherein each of said pistons is a gaseously actuated free piston and means are provided imposing an anti-vibration-transmitting limitation on the motion of said oscillatory mass with respect to said frame structure.

41. The combination of claim 40 in which such necessarily vibrating piston is a blow-striking piston, and in which said means imposing said limitation comprises means for developing a continuous force between said frame structure and oscillatory mass and applied thereto in the direction of blow delivery of said blow-striking piston.

42. The combination of claim 41 in which said continuous force is a non-vibration-transmitting force, and in which said means imposing said limitation also comprises means for regulatively altering the value of said non-vibration-transmitting force to restrict the range of motion of said oscillatory mass relative to said frame structure for controlling stop-and-rebound action therebetween.

43. In combination, a cylinder, a piston reciprocable therein, means for establishing between the cylinder and the piston throughout the cycle of piston reciprocation a substantially continuous axial force, said continuous force being the only material uncounterbalanced axial force developed between the cylinder and said piston during said cycle, valve means adapted to connect a source of gas pressure to said cylinder to impose intermittent axial force on said piston to cause movement thereof in opposition to said substantially continuous force, and feedback means for controlling the value of said continuous force so as to prevent transmission of vibration-exciting impact forces between said piston and said cylinder during normal operation of the structure.

44. The combination of a frame structure in which the occurrence of vibration is objectionable, a plurality of mass members supported by said frame for individual oscillatory motions relative thereto, means applying actuating forces to each of said oscillatory mass members and transmitting corresponding reaction forces to said frame, one of said mass members being unavoidably vibratory and one thereof being positionally controlled during the oscillatory motion thereof to prevent the transmission of impact force therefrom to said frame by suitable relative adjustment of the forces applied thereto, and feedback means for effecting such adjustment responsive to positions assumed by said oscillating mass member so positionally controlled, the algebraic sum of all of the components of said reaction forces along a predetermined axis remaining substantially constant during the oscillatory cycle of said unavoidably vibratory mass member wherefore vibration along such axis is substantially eliminated, such components acting in one direction therealong being taken as positive, and the other such components acting in the opposite direction being taken as negative for the definition of such algebraic sum.

45. In a percussive tool, the combination of a casing in which the occurrence of vibration is objectionable, a plurality of mass members supported by said casing for individual oscillatory motions relative thereto, means effective with respect to each of said mass members to cause oscillation of such mass member by producing cyclic relative variation of oppositely-operative accelerative forces applied by said means to such mass member and to transmit corresponding reaction forces to said casing, one of said mass members being a blow-striking mass developing impact force during a part of each of its oscillatory cycles and one thereof being positionally controlled during its oscillatory motion with respect to said casing by suitable relative adjustment of such oppositely-operative forces active thereupon so as to prevent the development and transmission of impact force between said positionally controlled mass member and said casing, and feedback means for effecting such adjustment responsive to positions assumed by said oscillating mass member so positionally controlled, the algebraic sum of all of the components of said reaction forces along the axis of motion of said blow-striking mass remaining substantially constant throughout each of said oscillatory cycles thereof wherefore vibration along such axis is substantially eliminated, such components acting in one direction therealong being taken as positive, and the other such components acting in the opposite direction being taken as negative for the definition of such algebraic sum.

46. The combination of claim 45 in which said reaction forces, considered during any oscillatory cycle of said blow-striking mass, include both variable forces and a substantially constant force, the algebraic sum of all of the components of said variable forces along said axis having a substantially constant value of zero and the value of said substantially constant force approximately equalling the cycle-time average value of the impact force developed by said blow-striking mass.

47. The percussive tool of claim 45 in which a cylinder is provided by said casing, the aforesaid mass member positionally controlled by said feedback means being a free piston reciprocable therein, and said means applying forces to each of said oscillatory mass members being gaseous pressure means.

48. The percussive tool of claim 47 in which said reaction forces considered during any oscillatory cycle of said blow-striking mass, include both variable forces and a substantially constant force, the algebraic sum of all of the components of said variable forces along said axis having a substantially constant value of zero and the value of said substantially constant force approximately equalling the cycle-time average value of the impact force developed by said blow-striking mass.

49. In a percussive tool, a casing in which the occurrence of vibration is objectionable, a plurality of mass members supported by said casing for individual oscillatory motions relative thereto, means alternately applying oppositely-acting actuating forces to each of said oscillatory mass members and transmitting corresponding opposite-phased reaction forces to said casing tending to vibrate the same, one of said mass members being a blow-striking mass developing useful impact force during a part of each of its oscillatory cycles and one thereof being positionally controlled in its normal oscillatory motion by suitable relative adjustment of the opposing forces applied thereto so as to prevent the intermittent stop-and-rebound transmission of vibration-producing amounts of momentum therefrom during end-of-stroke portions of its said normal oscillatory motion to said casing wherein vibration is objectionable, and auxiliary force-applying means responsive to positions assumed by said positionally-controlled oscillating mass member for accomplishing such adjustment, the oscillatory motions of said blow-striking and positionally-controlled mass members normally exhibiting an anti-vibrative phase relation intermediate coincident and opposed phases.

50. In a percussive tool, a casing in which the occurrence of vibration is objectionable, a plurality of mass members supported by said casing for individual oscillatory motions relative thereto, means applying accelerative forces to each of said mass members and transmitting corresponding reaction forces to said casing, one of said mass members being a blow-striking mass undergoing a substantially instantaneous deceleration during the impact phase of each of its oscillatory cycles, and one thereof being dynamically controlled during its normal oscillatory motion by suitable adjustment of the forces applied thereto so as to define a smoothly varying anti-vibrative velocity pattern in relation to the instantaneously varied velocity pattern of said blow-striking mass throughout substantially the full cycle of oscillation thereof, and feedback means responsive to the movement of said dynamically-controlled oscillating mass member for accomplishing such adjustment.

51. In a pneumatic percussive tool, a casing normally used in a vertical orientation, an impact-receiving element carried by said casing and useful in the transmission of impact force to an external object, an impact-delivering member constrained by said casing for reciprocatory movement terminating in one direction in impact engagement with said impact-receiving element, a vibration-compensating mass member supported by said casing for reciprocation generally along the line of movement of said impact-delivering member, said impact-delivering and vibration-compensating members being normally reciprocated in an intermediate phase relation by an intermittent impact rebound force applied upwardly against said impact-delivering member during such impact engagements together with varying and reversing pneumatic forces applied to each of said members, means for applying such a varying and reversing pneumatic force to the impact-delivering member accelerating the same through its useful reciprocatory cycle relative to the casing and developing a corresponding varying and reversing reaction force against said casing tending to accelerate it through an objectionable vibratory cycle, and means operative in pneumatically-enforced synchronism with the means applying the aforesaid varying and reversing pneumatic force to said impact-delivering member to apply a substantially equal and opposite varying and reversing pneumatic force to said vibration-compensating member accelerating the same through its reciprocatory cycle relative to the casing and developing against the casing a second varying and reversing reaction force approximately equal in frequency and amplitude and opposite in phase to said first-mentioned varying and reversing reaction force active thereupon so as to establish a condition of destructive interference between these two varying and reversing reaction forces, whereby the objectionable tendency of said first-mentioned reaction force to vibrate said casing is substantially annulled.

52. The percussive tool of claim 51 in which pneumatic means are provided for developing a force operative downwardly against said vibration-compensating member to oppose upward movements thereof, and in which means are also provided for adjusting the value of such force to positionally relate said vibration-compensating member and said casing so as to substantially prevent the transmission of vibration-producing amounts of stop-and-rebound force in an upward direction from said vibration-compensating member to said casing.

53. The percussive tool of claim 51 in which pneumatic means are provided for developing a non-vibration-transmitting force operative downwardly against said vibration-compensating member to oppose upward movement thereof, and in which means are also provided for adjusting the value of such non-vibration-transmitting force to positionally relate said vibration-compensating member and said casing to prevent the transmission of substantial vibration to said casing by stop-and-rebound engagements therebetween.

54. In a pneumatic percussive tool, the combination of a vibrationless outer casing, a percussive piston system carried in said casing, and a compensated anvil system likewise carried therein and arranged for cooperation with said percussive piston system; said casing comprising a main cylinder, a chamber communicating with said cylinder and disposed therebelow in axial alignment therewith, and hermetic partition means between said cylinder and chamber including an annular wall defining a centrally positioned aperture and transversely interposed therebetween; said percussive piston system comprising a blow-striking piston reciprocable in said main cylinder and means for actuating said piston therein including means for pressurizing a lower cylinder space defined between the upper surface of said annular wall and the bottom face of said piston to energize the backstroke movements thereof; and said compensated anvil system comprising an axially reciprocable anvil extending through said chamber and aperture in sealing relation with the circumjacent surface of the aperture and therefrom upwardly into said lower cylinder space to provide an upwardly-facing surface therein adapted to receive impact force from said piston and also having an outwardly-extending annular shoulder intermediate its ends in sealing relation with the walls of said chamber to separate the same into a lower pressurizable chamber space and an upper chamber space connected with atmosphere, said annular shoulder on the anvil defining an upwardly-facing surface below and axially abuttable with the lower surface of said annular wall and a downwardly-facing surface approximately equal in axially projected area to said upwardly-facing impact-receiving surface of the anvil received within the lower cylinder space, and a flow conduit connecting said lower chamber space with said lower cylinder space for the simultaneous development of substantially equal pressures therein: whereby the objectionable pressure-applied downward force which would otherwise be transmitted through the anvil to a work object during such backstroke of the blow-striking piston is substantially eliminated, and whereby the lower surface of said annular wall comprised by said vibrationless casing may be continuously positioned in effective adjacency with said upwardly-facing surface of the shoulder defined on the anvil to obstruct objectionable upward jumping action of said anvil between impacts of said blowstriking piston thereupon.

55. In a pneumatic percussive tool, the combination of a vibrationless casing defining a cylinder regarded as vertically oriented and also defining a chamber communicating with said cylinder and disposed therebelow in axial alignment therewith, a hammer sealingly reciprocable within said cylinder for successive pneumatic actuations of the backstroke movements thereof, an axially reciprocable compensated anvil extending through said chamber in sealing relation with the circumjacent walls thereof and sealingly projecting upwardly into the lower end of said cylinder for receiving impact force from said hammer, and means for pressurizing the lower end of said chamber substantially simultaneously with pressurization of the lower end of said cylinder for such backstroke actuation.

56. In a hand-held pneumatic percussive tool, the combination of a vibrationless casing defining a cylinder and a chamber coaxial with said cylinder and in communication with an end thereof and cylinder-head means including an annular wall transversely and coaxially interposed between said cylinder and chamber, a hammer sealingly reciprocable within said cylinder for pneumatic actuation of the backstroke movements thereof, a coaxially reciprocable anvil extending through said chamber and through and surrounded by said annular wall and into the end portion of the cylinder defined between said annular wall and said hammer for receiving impact force from said hammer and having intermediate its ends an outwardly-extending annular shoulder sealingly engaging the walls of said chamber and axially abuttable with said annular wall comprised by the vibrationless casing, and means for substantially simultaneously pressurizing said end portion of the cylinder to effect such backstroke actuation of the hammer and the end portion of said chamber that extends from said annular shoulder on the anvil and away from said cylinder to apply an axial pressure force through said annular shoulder to the anvil in opposition to the axial pressure force applied thereto by such pressurization of said end portion of the cylinder into which said anvil extends, whereby the manual maintenance of an anvil-stabilizing condition of abutment between said annular wall comprised by the casing and said annular shoulder defined on the anvil is facilitated and the wasteful transmission through said anvil of said last-mentioned pressure force developed thereagainst inside the cylinder is counter-actively reduced.

57. In a pneumatic percussive tool, the combination of a vibrationless casing defining a main cylinder regarded as vertically oriented, a blow-striking piston reciprocable in said cylinder, means for actuating said piston through a blow-stroke and backstroke cycle including means for gaseous pressurizing the lower end of said cylinder for actuation of the backstroke movement thereof, an axially reciprocable impact-receiving-and-delivering member carried by said casing and extending into the lower end of said cylinder and providing an upwardly-facing surface therein adapted to receive impact force from said piston and having a downwardly-facing impact-delivering surface and also a second downwardly-facing surface, an upwardly-facing surface reciprocably opposed to said second downwardly-facing surface of the impact-receiving-and-delivering member and related to said casing for the transmission of downward pressure force thereto, a pressurizable variable space defined between upper and lower end closures therefor consisting respectively of said second downwardly-facing surface defined on the impact-receiving-and-delivering member and of said reciprocably opposed upwardly-facing surface so related to the casing, and means for gaseously pressurizing said space and said upwardly- and downwardly-facing surfaces comprising end closures therefor in substantially same-phase synchronism with the backstroke-actuating pressurization of the lower end of said cylinder, whereby a substantial portion of the downward pressure force applied in the cylinder to said upwardly-facing surface of the impact-receiving-and-delivering member during such backstroke-actuating pressurization is diverted from wasteful delivery therethrough to the work object to be transmitted instead through said second downwardly-facing surface thereof comprising the upper end closure of said space thence through the gaseous contents of said space to said upwardly-facing surface comprising its lower end closure and therefrom to said vibrationless casing to assist the workman in maintaining the same in a preferred axial positional relation with said impact-receiving-and-delivering member.

58. In a hand-held pneumatic percussive tool, the combination of a vibrationless casing comprising a cylinder regarded as vertically oriented and a pressurizable chamber below and coaxial therewith and a partition transversely interposed between said chamber and cylinder defining an aperture establishing axial communication therebetween, a blow-striking piston reciprocable within said cylinder, means for propelling said piston through a blow-stroke and backstroke cycle including pneumatic means for causing pressurization of the variable space defined in the lower end of the cylinder between said partition and said piston for actuating the backstroke movement thereof, an axially reciprocable anvil extending through said chamber and through the aperture in said partition to define thereabove in said lower cylinder space an upwardly-facing surface receiving useful impact force from said piston at the end of the blow-stroke thereof and a pressure-applied downward thrust resulting from and ordinarily wastefully transmitted to the work object simultaneously with such backstroke-actuating pressurization of said space and also defining below said partition an outwardly-extending annular shoulder axially abuttable therewith and sealingly engaging the walls of said chamber, and pneumatic means for pressurizing said chamber below said annular shoulder of the anvil substantially simultaneously with such backstroke-actuating pressurization of said lower cylinder space so as to oppose said pressure-applied downward thrust upon the anvil by thus developing an upwardly-acting pressure force against said shoulder thereof while at the same time reactively developing an equal downwardly-acting pressure force upon said casing; whereby a substantial portion of said ordinarily wasted pressure-applied downward thrust is pneumatically diverted to the casing and cooperatively employed with the vibrationless characteristic thereof for facilitating manual maintenance of an anvil-stabilizing abutment between said partition comprised thereby and said annular shoulder defined on the anvil, so that, in the proper operation of the tool, a greater proportion of the total manual and gravitational input of downward momentum to the tool is conserved against wasteful transmission through the anvil to the work object between the instants of blow delivery and concentrated into effective blows free of rattling degeneration in those instants.

59. In a hand-held pneumatic percussive tool, a vibrationless casing defining a cylinder having a blow-striking piston reciprocable therein, end closure means providing an annular wall extending transversely of said cylinder at one end thereof, an axially reciprocable anvil carried by said casing and extending through said annular wall and into said cylinder and providing an upwardly-facing surface therein adapted to receive impact force from said piston and having also an outwardly-extending shoulder abuttable with said annular wall and defining a downwardly-facing surface thereon, said casing defining a pressurizable space therein having said downwardly-facing surface of said reciprocable anvil as the upper end closure thereof, and means for pressurizing said space and downwardly-facing surface in substantially same-phase synchronism with the piston-actuating pressurization of the aforementioned end portion of said cylinder and said upwardly-facing surface therein, whereby a substantial portion of the pressure-derived, downward force normally transmitted through said anvil to a work object is transferred into downward application to said casing so that the manual maintenance of abutment between said annular wall and said shoulder is facilitated.

60. In the combination of a hand-held pneumatic percussive tool with a compensated anvil, a vibrationless casing defining a main cylinder therein, a blow-striking piston reciprocable within said cylinder, a lower end closure for said cylinder defining an annular wall providing a central opening therethrough, a chamber axially disposed below said cylinder and communicating therewith through the opening in said annular wall, an elongated anvil extending through said chamber and into said cylinder through the opening in said annular wall and having an upwardly oriented face adapted to receive impact force from said hammer and having also an outwardly-extending annular shoulder sealingly engaging the walls of said chamber and being abuttable with said annular wall, an impact-delivering work member carried by said casing for axial reciprocation relative thereto and being abuttable at its upper end with the lower end of said anvil, seal means extending about the respective end portions of said anvil for pressure-isolating said chamber, means for venting the upper end portion of said chamber above said shoulder, and conduit means establishing communication between the lower end of said cylinder and the lower end of said chamber below said shoulder for pressurizing the same in substantially same-phase synchronism with the piston-actuating pressurization of the lower end portion of said cylinder to apply an axial pressure force to said anvil in opposition to the axial pressure force applied thereto by such piston-actuating pressurization of the lower end portion of said cylinder, whereby a substantial portion of the pressure-derived, downward force normally transmitted through said anvil to said work member and wasted thereby against the work material is transferred into downward application to said casing thus facilitating the manual maintenance of abutment between said annular wall and the upper surface of said shoulder to enforce correct seating of the lower end of said anvil on the upper end of said work member for the downward transmission of impact therebetween.

61. In a method of anti-vibrative suspension for a body in which vibration is objectionable supported through the intermediate agency of a force-transmitting pneumatic column by an unavoidably vibrating body defining with said supported body a preferred positional relation therebetween subject to permissible commencing deviations therefrom sometimes tending to assume larger objectionable amplitudes permitting vibration-communicating intermittent force transmission from said vibrating body to said supported body by stop-and-rebound action therebetween, the respective steps for controlling the supporting force applied through said pneumatic column to said supported body of selectively altering the quantity of gaseous matter in said column with respect to each successive commencing deviation from such preferred positional relation between the bodies so as to properly adjust the density of the column to yield an adjustment in said supporting force providing a corrective action normally suppressing such commencing deviation before increase thereof to such larger amplitudes, and of automatically altering the quantity of gaseous matter in said column in synchronism with the vibratory displacements of said vibrating body so as to continuously maintain any such adjusted density of the column substantially invariant with respect to such displacements.

62. In a method of anti-vibrative suspension for a body wherein vibration is objectionable and which sustains a variable load and is supported by a vibrating body through the intermediate agency of a pneumatic column transmitting force between said bodies, the steps of responsively altering the quantity of gaseous matter in the column affording a supporting force for said body in which vibration is objectionable in relation to each successive value of the load sustained thereby so as to provide in correspondence to each such load value a properly adjusted density of the column to yield an approximately equal supporting force value, and of cyclically altering the quantity of gaseous matter in the column so as to continuously maintain any such adjusted density value substantially invariant with respect to the vibratory displacements of said vibrating body.

63. In a method of anti-vibrative suspension for a body wherein vibration is objectionable which sustains a variable load and is supported by a vibrating body through the intermediate agency of a linkage transmitting force between said bodies, the steps of responsively adjusting the value of the supporting force transmitted through said linkage to said body wherein vibration is objectionable in relation to each successive value of the load sustained thereby so as to provide in correspondence to each such load value an approximately equal supporting force value, and of maintaining any such adjusted force value substantially invariant with respect to the vibratory displacements of said vibrating body.

64. In a method of anti-vibrative suspension for a body in which vibration is objectionable supported by an unavoidably vibrating body through the intermediate agency of a force-transmitting linkage establishing the required supporting force therebetween, the steps of selectively adjusting the value of said supporting force so as to produce corrective action opposing the continuation of any deviation from a preferred positional relation between said supported body and said vibrating body which provides sufficient remoteness between said bodies to normally prevent the development of vibration-transmitting stop-and-rebound action between them, and of maintaining any such adjusted force value substantially invariant with respect to the vibratory displacements of said vibrating body.

65. In a pneumatic percussive tool, a casing in which the occurrence of vibration is undesirable providing a main cylinder therein, said main cylinder having end closures respectively defining upper and lower reaction surfaces, a hammer reciprocable within said main cylinder between said reaction surfaces, an impact-receiving-and-transmitting member coaxially slidable in said casing and extending upwardly into said main cylinder through and in sealing relation with the lower end closure thereof, means for applying fluid pressure alternately between the respective ends of said hammer and the respectively opposing reaction surfaces to reciprocate said hammer, a force-counter-balancing system comprising an oscillator cylinder rigidly related to said casing and having end closures respectively defining upper and lower counterbalancing surfaces oriented in respective opposition to the aforesaid reaction surfaces, an oscillator reciprocable within said oscillator cylinder between said counterbalancing surfaces, flow conduit means connecting the upper end of said oscillator cylinder with the lower end of said main cylinder for simultaneously transferring pressure developed against said lower reaction surface to said upper counterbalancing surface, and a second flow conduit means connecting the lower end of said oscillator cylinder with the upper end of said main cylinder for simultaneously transferring pressures developed against said upper reaction surface to said lower counterbalancing surface, each of said reaction surfaces and the counterbalancing surfaces opposed thereby having approximately equal areas, the algebraic sum of the forces tending to displace said casing as a result of discrepancies in the equality of the areas of said reaction surfaces and the counterbalancing surfaces respectively opposed thereby, discrepancies in the simultaneity of the pressurization of the reaction surfaces and the counterbalancing surfaces respectively opposed thereby and in the equality of the pressures effecting each such simultaneous pressurization, and discrepancies from a condition of frictionless reciprocation of said hammer and oscillator, being less than the frictional force operative between said casing and impact-receiving-and-transmitting member slidable therein.

References Cited in the file of this patent

UNITED STATES PATENTS

| | | |
|---|---|---|
| 2,072,445 | Erling | May 2, 1937 |
| 2,400,650 | Leavell et al. | May 21, 1946 |
| 2,679,826 | Leavell | June 11, 1954 |
| 2,748,750 | Altschuler | June 5, 1956 |
| 2,762,341 | Salengro | Sept. 11, 1956 |